United States Patent
Hiramatsu et al.

(10) Patent No.: US 8,774,552 B2
(45) Date of Patent: Jul. 8, 2014

(54) IMAGE TRANSFER SYSTEM, IMAGE TRANSFER METHOD, IMAGE RECEPTION APPARATUS, IMAGE TRANSMISSION APPARATUS, AND IMAGE PICKUP APPARATUS

(75) Inventors: Yoshitaka Hiramatsu, Sagamihara (JP); Koichi Hamada, Kawasaki (JP); Kenichi Yoneji, Kodaira (JP); Masahiro Kageyama, Hino (JP); Muneaki Yamaguchi, Inagi (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 197 days.

(21) Appl. No.: 13/369,342

(22) Filed: Feb. 9, 2012

(65) Prior Publication Data
US 2012/0236183 A1 Sep. 20, 2012

(30) Foreign Application Priority Data
Mar. 18, 2011 (JP) ................................. 2011-060241

(51) Int. Cl.
*G06K 9/40* (2006.01)
*G06K 9/32* (2006.01)

(52) U.S. Cl.
USPC .......................................... 382/269; 382/298

(58) Field of Classification Search
USPC .................. 382/232, 233, 269, 275, 298, 299
See application file for complete search history.

(56) References Cited

U.S. PATENT DOCUMENTS

| | | | |
|---|---|---|---|
| 7,561,752 B2 * | 7/2009 | Monobe et al. | 382/268 |
| 2008/0024671 A1 * | 1/2008 | Lee | 348/625 |
| 2009/0009660 A1 | 1/2009 | Kageyama et al. | |
| 2012/0268465 A1 * | 10/2012 | Inada | 345/428 |

FOREIGN PATENT DOCUMENTS

| | | |
|---|---|---|
| JP | 2005-348320 A | 12/2005 |
| JP | 2009-017242 A | 1/2009 |

OTHER PUBLICATIONS

Computer translation of Japanese Patent No. JP-06-090444, pp. 1-5, 2994.*
S. Ando, "A Velocity Vector Field Measurement System Based on Spatio-Temporal Image Derivative", Transactions of Instrument and Control Engineers, vol. 22, No. 12, Dec. 1986, pp. 1330-1336, and English translation.
H. Kobayashi et al, "Calculation Methods of a Phase-Only Correlation Function for Images based on Discrete Cosine Transform", The Institute of Electronics Information and Communication Engineers, IEICE Technical Report ITS2005-92, IE2005-299 (Feb. 2006), pp. 73-78, and English translation.

* cited by examiner

*Primary Examiner* — Daniel Mariam
(74) *Attorney, Agent, or Firm* — Mattingly & Malur, PC

(57) ABSTRACT

In order to transfer an image encoded at a high compression rate and suitably increase the resolution of the transferred image, it is provided an image transfer system, comprising: an image transmission unit that transmits an image; and an image reception unit that receives the image transmitted from the image transmission unit. The image transmission unit scales down the image, and transmits the scaled-down image to the image reception unit. The image reception unit calculates an angle between a line displayed in the image transmitted from the image transmission unit and a horizontal direction of the image in correspondence with pixels included in the image, scales up the image transmitted from the image transmission unit, and removes an aliasing component of the scaled-up image based on the calculated angle.

17 Claims, 21 Drawing Sheets

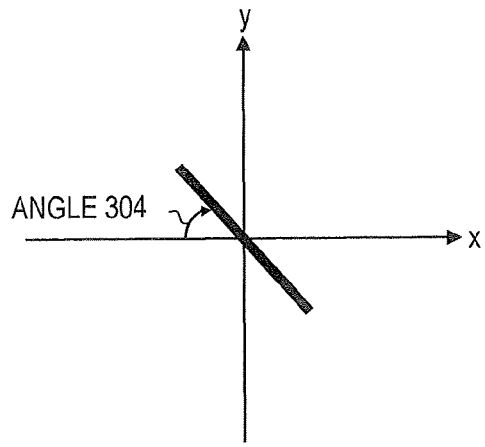
Fig. 5A
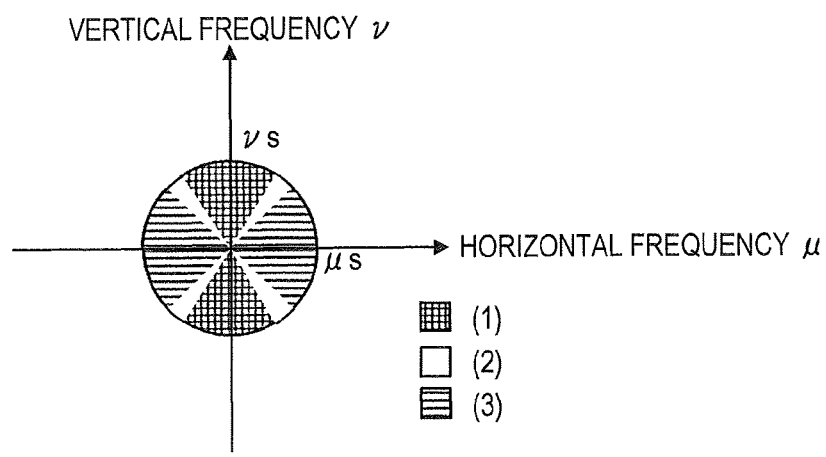
Fig. 5B
| ANGLE304 (HORIZONTAL LINE = 0 (rad)) | | $\alpha$ |
|---|---|---|
| (1) $0 \sim 3\pi/16$ | ▦ | 1 |
| (2) $3\pi/16 \sim \pi/4$ | ☐ | 0.5 |
| (3) $\pi/4 \sim \pi/2$ | ☰ | 0 |
Fig. 5C

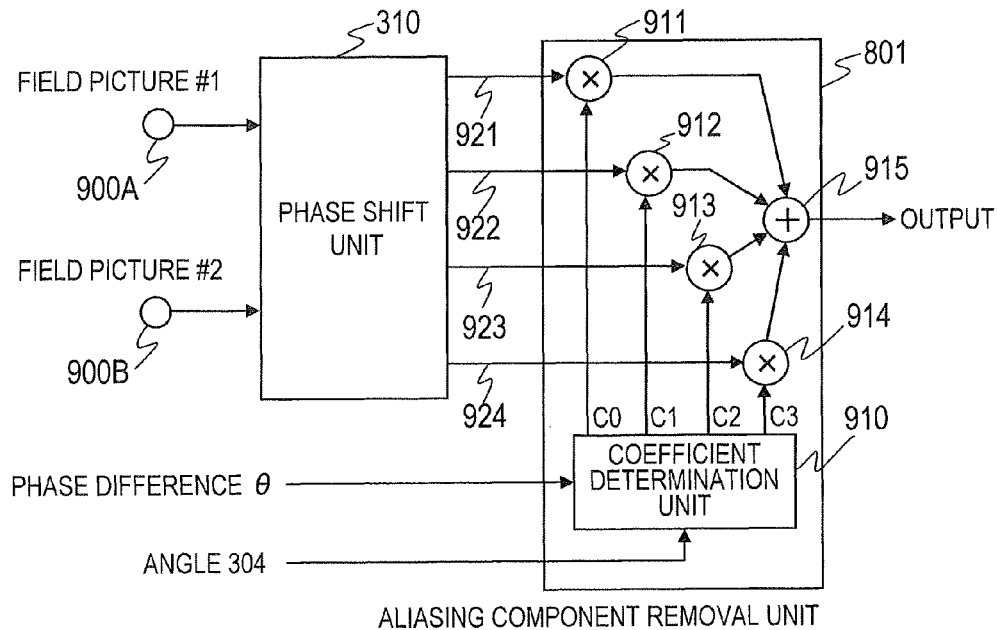

Fig. 9

(a)
(1) TOTAL OF ORIGINAL COMPONENTS ALONG Re-AXIS = 1
(2) TOTAL OF ORIGINAL COMPONENTS ALONG Im-AXIS = 0
(3) TOTAL OF ALIASING COMPONENTS ALONG Re-AXIS = $\alpha$
(4) TOTAL OF ALIASING COMPONENTS ALONG Im-AXIS = 0

(b)
(1) $C0 + C2 = 1$
(2) $C1 + C3 = 0$
(3) $C0 + (C2 \cdot \cos\theta - C3 \cdot \sin\theta) = \alpha$
(4) $C1 + (C2 \cdot \sin\theta + C3 \cdot \cos\theta) = 0$ (c)
$\alpha = 0$
$C0 = 1/2$
$C1 = -(1+\cos\theta)/(2\sin\theta)$
$C2 = 1/2$
$C3 = (1+\cos\theta)/(2\sin\theta)$ (d)

| $\theta$ | C0 | C1 | C2 | C3 |
|---|---|---|---|---|
| 0 | 0.5 | -- | 0.5 | -- |
| $\pi/8$ | 0.5 | -2.51 | 0.5 | 2.51 |
| $2\pi/8$ | 0.5 | -1.21 | 0.5 | 1.21 |
| $3\pi/8$ | 0.5 | -0.75 | 0.5 | 0.75 |
| $4\pi/8$ | 0.5 | -0.5 | 0.5 | 0.5 |
| $5\pi/8$ | 0.5 | -0.33 | 0.5 | 0.33 |
| $6\pi/8$ | 0.5 | -0.21 | 0.5 | 0.21 |
| $7\pi/8$ | 0.5 | -0.1 | 0.5 | 0.1 |
| $8\pi/8$ | 0.5 | 0 | 0.5 | 0 |
| $9\pi/8$ | 0.5 | 0.1 | 0.5 | -0.1 |
| $10\pi/8$ | 0.5 | 0.21 | 0.5 | -0.21 |
| $11\pi/8$ | 0.5 | 0.33 | 0.5 | -0.33 |
| $12\pi/8$ | 0.5 | 0.5 | 0.5 | -0.5 |
| $13\pi/8$ | 0.5 | 0.75 | 0.5 | -0.75 |
| $14\pi/8$ | 0.5 | 1.21 | 0.5 | -1.21 |
| $15\pi/8$ | 0.5 | 2.51 | 0.5 | -2.51 |

Fig. 10

(a) FREQUENCY SPECTRUM OF IMAGE INPUT TO VERTICAL UP-SCALER (b) FREQUENCY SPECTRUM OF OUTPUT OF UPSAMPLING UNIT

PHASE RELATIONSHIP BETWEEN RESPECTIVE COMPONENTS

PHASE RELATIONSHIP BETWEEN ORIGINAL COMPONENTS

PHASE RELATIONSHIP BETWEEN ALIASING COMPONENTS

IMAGE TRANSFER SYSTEM, IMAGE TRANSFER METHOD, IMAGE RECEPTION APPARATUS, IMAGE TRANSMISSION APPARATUS, AND IMAGE PICKUP APPARATUS

CLAIM OF PRIORITY

The present application claims priority from Japanese patent application JP 2011-60241 filed on Mar. 18, 2011, the content of which is hereby incorporated by reference into this application.

BACKGROUND OF THE INVENTION

This invention relates to an image transfer system, and more particularly, to an image transfer system for encoding and transmitting an image.

For example, JP 2005-348320 A proposes a data compression technology for reducing a data amount in view of a steeply increasing data amount due to an increase in moving image quality. Specifically, JP 2005-348320 A discloses a technology for restoring an image after thinning out the image in a spatial direction.

Further, in recent years, there has been a strong demand for higher-definition videos and images in digital cameras, digital video players/recorders, television receivers, and the like, and hence various technologies for increasing the resolution are proposed. Specifically, JP 2009-017242 A discloses a technology for increasing the number of pixels while increasing the resolution from an interlaced scanned image by performing interlace-progressive scanning conversion (i.e., I-P conversion) for compositing a plurality of field pictures of interlace scanning to form one image frame.

SUMMARY OF THE INVENTION

At present, it is mainstream to use the interlaced scanned image for a television broadcast signal. In a system in which the technology for restoring an image after thinning out the image in a spatial direction, which is disclosed in JP 2005-348320 A, and the technology for increasing the resolution, which is disclosed in JP 2009-017242 A, are applied to such an interlaced scanned image, if the field pictures of the interlace scanning are reduced in image size by simply thinning out the number of pixels, aliasing components occur in frequency spectrums of the image in respective horizontal and vertical directions.

Then, the aliasing components occur in the field pictures also along the vertical direction with the progress of the interlace scanning. Most of the aliasing components occurring along the vertical direction accompanying the interlace scanning return to an original state when the image is displayed. The "return to an original state" indicates that the display based on the aliasing component becomes so equal to the display based on an original component as to keep a human from recognizing the aliasing component as noise.

Here, referring to FIG. 22A, a description is made of the aliasing component.

FIG. 22A is an explanatory diagram illustrating frequency spectrums of an image according to the related art.

FIG. 22A illustrates frequency spectrums of a given one-dimensional signal by expressing the frequency spectrums with three axes of a frequency axis, a real axis, and an imaginary axis. Further, a sampling frequency of the one-dimensional signal is set as fs. Based on such a principle of the sampling theorem that an original component 1101 is repeated at intervals of the frequency fs, an aliasing component 1105 occurs in a position at the frequency fs in terms of the origin. A sum of the aliasing component 1105 and the original component 1101 forms the frequency spectrum of the one-dimensional signal. An overlapping portion between the original component 1101 and the aliasing component 1105 is called "aliasing", and image degradation such as noise is caused if the aliasing occurs.

The method disclosed in JP 2009-017242 A has a feature that the aliasing components along a direction in which a subject is moving are removed to thereby be capable of increasing the resolution of the image. Therefore, in a case where the subject is moving along the vertical direction of the image, the aliasing components along the vertical direction which occur with the progress of the interlace scanning are removed. However, most of the aliasing components along the vertical direction which occur with the progress of the interlace scanning are components that return to the original state. This raises a problem that the removal of the aliasing components along the vertical direction causes the image degradation such as noise instead.

Further, in a case where there is an overlap between the aliasing distortion that has occurred due to the down-scaling of the image and the aliasing distortion along the vertical direction which has occurred with the progress of the interlace scanning, neither of those aliasing distortions can be removed appropriately by the method disclosed in JP 2009-017242 A. As a result, there arises a problem that the image degradation such as noise manifests itself.

This invention has been made in view of the above-mentioned problems of the related art, and it is an object thereof to provide a technology for scaling down an image by interlace scanning and then generating a high-resolution image exhibiting little image degradation from the scaled-down image.

In addition, even in a case of transmitting an image by using progressive scanning, the sampling theorem is used, and the aliasing distortion is caused in an image to be displayed. Therefore, it is another object of this invention to generate a high-resolution image by appropriately removing the aliasing distortion even in the system using the progressive scanning.

The representative one of inventions disclosed in this application is outlined as follows. There is provided an image transfer system, comprising: an image transmission unit that transmits an image; and an image reception unit that receives the image transmitted from the image transmission unit. The image transmission unit scales down the image, and transmits the scaled-down image to the image reception unit. The image reception unit calculates an angle between a line displayed in the image transmitted from the image transmission unit and a horizontal direction of the image in correspondence with pixels included in the image, scales up the image transmitted from the image transmission unit, and removes an aliasing component of the scaled-up image based on the calculated angle.

According to an aspect of this invention, it is possible to transfer an image encoded at a high compression rate and suitably increase the resolution of the transferred image.

BRIEF DESCRIPTION OF THE DRAWINGS

The present invention can be appreciated by the description which follows in conjunction with the following figures, wherein:

FIG. 5A is an explanatory diagram illustrating an angle according to the first embodiment of this invention;

FIG. 5B is an explanatory diagram illustrating a spatial frequency spectrum according to the first embodiment of this invention;

FIG. 5C is an explanatory diagram illustrating a correspondence between an angle and a coefficient α according to the first embodiment of this invention;

FIG. 9 is a block diagram illustrating configurations of a phase shift unit and an aliasing component removal unit according to the first embodiment of this invention;

FIG. 10 is an explanatory diagram illustrating a coefficient calculation method performed by a coefficient determination unit according to the first embodiment of this invention;

DETAILED DESCRIPTION OF THE PREFERRED EMBODIMENTS

Figure 1:
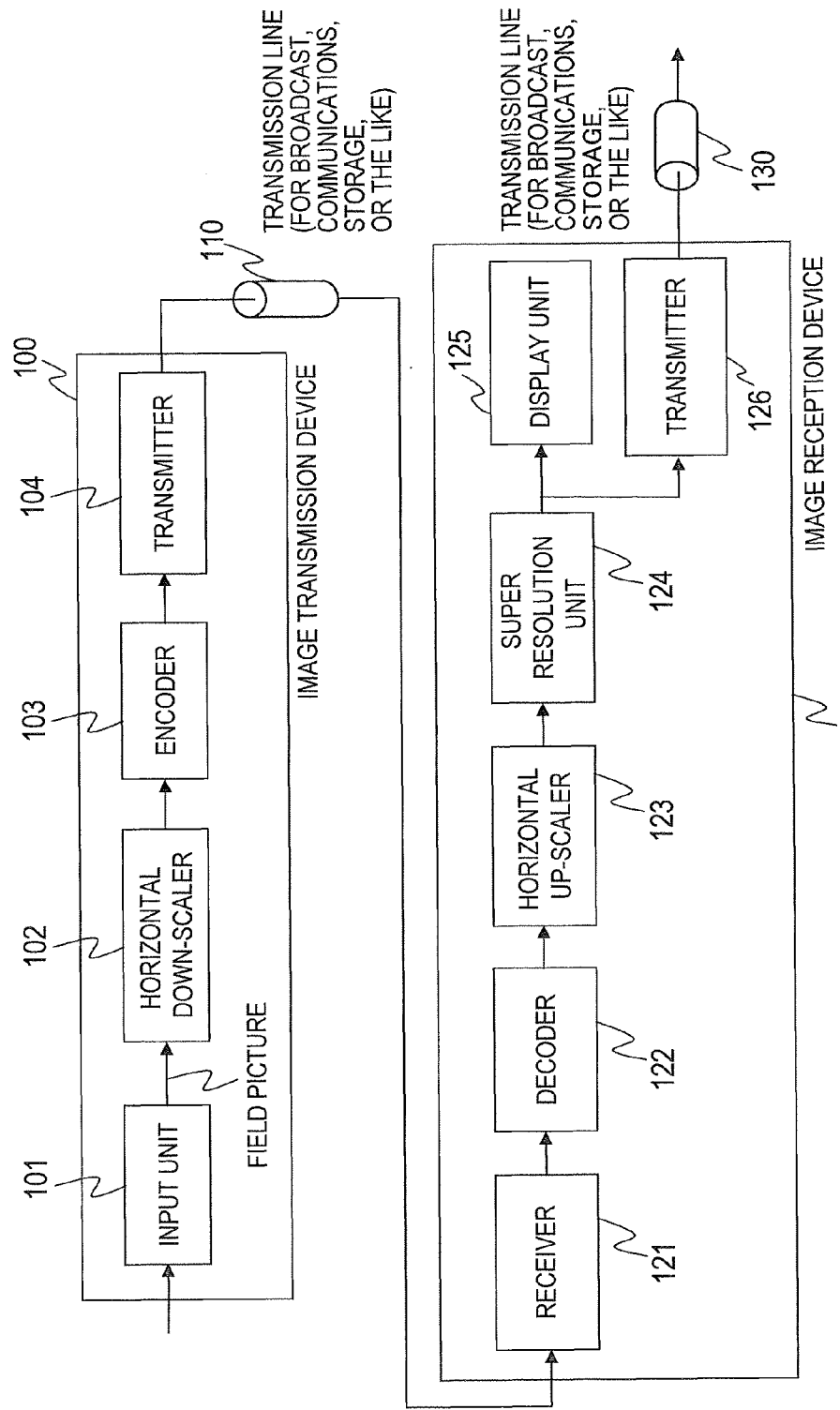
FIG. 1 is a block diagram illustrating an image transfer system according to a first embodiment of this invention.

Hereinafter, embodiments of this invention are described with reference to the accompanying drawings. It should be noted that components denoted by the same reference numerals have the same functions in the respective drawings.

First Embodiment

FIG. 1 is a block diagram illustrating an image transfer system according to a first embodiment of this invention.

The image transfer system includes an image transmission device 100, a transmission line 110, an image reception apparatus 120, and a transmission line 130. The image transmission apparatus 100 is coupled to the image reception apparatus 120 via the transmission line 110.

The image transmission apparatus 100 includes an input unit 101, a horizontal down-scaler 102, an encoder 103, and a transmitter 104.

The image transmission apparatus 100 may be a computer including a processor and a memory, and may implement functions such as the input unit 101, the horizontal down-scaler 102, the encoder 103, and the transmitter 104 by programs. Alternatively, the image transmission device 100 may implement the functions such as the input unit 101, the horizontal down-scaler 102, the encoder 103, and the transmitter 104 by elements such as LSIs.

Further, the image transmission device 100 may include an input device that allows an administrator or the like to input a parameter to be used in the image transmission device 100.

The input unit 101 receives an input of, for example, a field picture of a moving image such as a television broadcast signal. Further, if an encoded stream is input to the input unit 101, the input unit 101 decodes the input encoded stream, and extracts the field picture of the moving image from within the decoded stream.

The horizontal down-scaler 102 is a function for reducing the number of pixels in a horizontal direction of the field picture transmitted from the input unit 101. In other words, the horizontal down-scaler 102 scales down the field picture in the horizontal direction. The horizontal down-scaler 102 is described later in detail with reference to FIGS. 2A and 2B.

The encoder 103 is a function of encoding the field picture scaled down in the horizontal direction by the horizontal down-scaler 102. The transmitter 104 is a function of transmitting the field picture encoded by the encoder 103 to the image reception device 120 via the transmission line 110. In a case where the image transmission device 100 is a transmission device of a broadcast station, the transmitter 104 transmits encoded image data by radio waves or the like.

The transmission line 110 is a transmission line for transmitting the encoded image data including the encoded image. Further, the transmission line 110 may not only be the transmission line for communications but also be a transmission line for broadcast or storage.

The image reception device 120 includes a receiver 121, a decoder 122, a horizontal up-scaler 123, a super resolution unit 124, a display unit 125, and a transmitter 126.

The image reception device 120 may be a computer including a processor and a memory, and may implement functions such as the receiver 121, the decoder 122, the horizontal up-scaler 123, the super resolution unit 124, the display unit 125, and the transmitter 126 by programs. Further, the image reception device 120 may implement the functions such as the receiver 121, the decoder 122, the horizontal up-scaler 123, the super resolution unit 124, the display unit 125, and the transmitter 126 by elements such as LSIs.

Further, the image reception device 120 may include an input device that allows the administrator or the like to input a parameter to be used in the image reception device 120.

The receiver 121 is a function for receiving the field picture transmitted from the image transmission device 100. In a case where the image reception device 120 is a broadcast reception device or the like, the receiver 121 receives the encoded image data transmitted by radio waves or the like.

The decoder 122 is a function for decoding the field picture encoded by the encoder 103 of the image transmission device 100. The decoder 122 decodes the encoded image data received by the receiver 121, and generates the field picture.

The horizontal up-scaler 123 is a function for increasing the number of pixels in the horizontal direction of the field picture that has been scaled down in the horizontal direction by the horizontal down-scaler 102. In other words, the horizontal up-scaler 123 scales up the field picture in the horizontal direction. The horizontal up-scaler 123 is described later in detail with reference to FIG. 2C.

The super resolution unit 124 is a function for increasing the resolution of the field picture received from the horizontal up-scaler 123. The super resolution unit 124 is described later in detail with reference to FIG. 3 or 8.

The display unit 125 is a function for displaying the field picture as an image. The display unit 125 displays the field picture whose resolution has been increased by the horizontal up-scaler 123 and the super resolution unit 124. Used as the display unit 125 is, for example, a plasma display panel, a liquid crystal display panel, or an electron or field emission display panel.

The transmitter 126 is a function for transmitting the field picture whose resolution has been increased by the horizontal up-scaler 123 and the super resolution unit 124 via the transmission line 130. The transmitter 126 transmits the field picture to other equipment or the like via the transmission line 130.

Figure 2A:
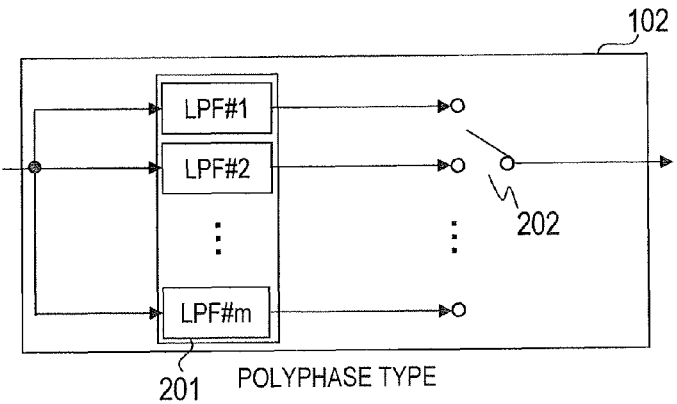
FIG. 2A is a block diagram illustrating a horizontal down-scaler of a polyphase type according to the first embodiment of this invention.
Figure 2B:
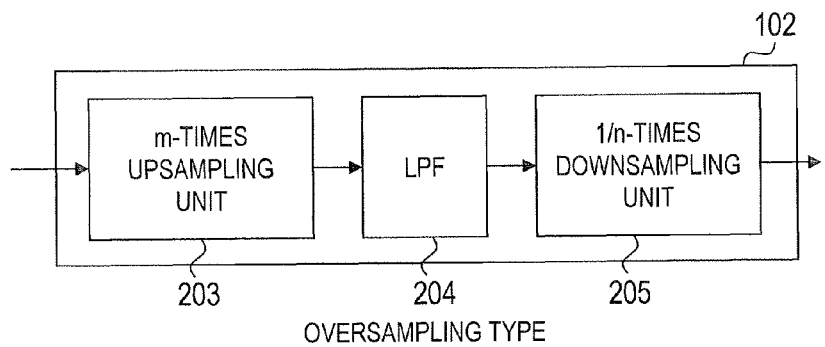
FIG. 2B is a block diagram illustrating the horizontal down-scaler of a oversampling type according to the first embodiment of this invention.

FIGS. 2A and 2B are block diagrams illustrating the horizontal down-scaler 102 according to the first embodiment of this invention.

The horizontal down-scaler 102 has a pixel conversion function of converting the number of pixels (in other words, number of samples). The horizontal down-scaler 102 is generally implemented by a polyphase type or an oversampling type.

FIG. 2A is a block diagram illustrating the horizontal down-scaler 102 of the polyphase type according to the first embodiment of this invention.

The horizontal down-scaler 102 of the polyphase type illustrated in FIG. 2A includes a plurality of interpolation low-pass filter units 201 and a switch unit 202.

In a case where the number of pixels in the horizontal direction is converted by a conversion rate of m/n times (where m and n both represent an integer), the horizontal down-scaler 102 illustrated in FIG. 2A includes m interpolation low-pass filter units 201 having a predetermined frequency characteristic. Further, the switch unit 202 switches over outputs from the interpolation low-pass filter units 201 so as to be output based on an order determined by the integer m and the integer n.

FIG. 2B is a block diagram illustrating the horizontal down-scaler 102 of the oversampling type according to the first embodiment of this invention.

The horizontal down-scaler 102 of the oversampling type illustrated in FIG. 2B includes an upsampling unit 203, an interpolation low-pass filter unit 204, and a downsampling unit 205. In the case where the number of pixels in the horizontal direction is converted by the conversion rate of m/n times, the upsampling unit 203 first subjects the number of samples included in the field picture to m-times upsampling.

Specifically, the upsampling unit 203 arranges input data of the pixels in the field picture every integer m pixels in order in the horizontal direction. Then, the upsampling unit 203 adds "0" to (m−1) pixels therebetween.

After that, the interpolation low-pass filter unit 204 filters the data transmitted from the upsampling unit 203 based on the predetermined frequency characteristic. In addition, the downsampling unit 205 downsamples the input data transmitted from the interpolation low-pass filter unit 204 by a factor of 1/n. In other words, the downsampling unit 205 performs thinning out by selecting one pixel every integer n pixels at regular intervals, and then outputs the thinned-out input data.

The function of the horizontal down-scaler 102 illustrated in FIG. 2B may be implemented by a generally-used method. The interpolation low-pass filter unit 204 according to the first embodiment retains a value of a cut-off frequency. Further, the upsampling unit 203 according to the first embodiment retains the integer m used for upsampling, and the downsampling unit 205 retains the integer n used for downsampling.

The interpolation low-pass filter unit 204 deletes components in a frequency band other than a frequency band (passband) spaced apart from a sampling frequency by the cut-off frequency. The cut-off frequency and the conversion rate that are used by the horizontal down-scaler 102 according to this embodiment are set in advance by the administrator or the like.

The encoder 103 of the image transmission device 100 compresses the image scaled down by the horizontal down-scaler 102, and then encodes the compressed image. The encoder 103 may use any video encoding method that is used to compress a video signal. For example, a video encoding method such as MPEG-2, MPEG-4, or H.264/AVC may be used. Further, in a case where the transmission line 110 retains a sufficient communication band or a case where a delay is reduced to the minimum extent, the encoder 103 does not need to encode the image.

According to the embodiment of this invention, the field picture scaled down in the horizontal direction by the horizontal down-scaler 102 is compressed, and hence an improvement in the compression rate can be expected in comparison with the image transfer system that does not include the horizontal down-scaler 102.

Figure 2C:
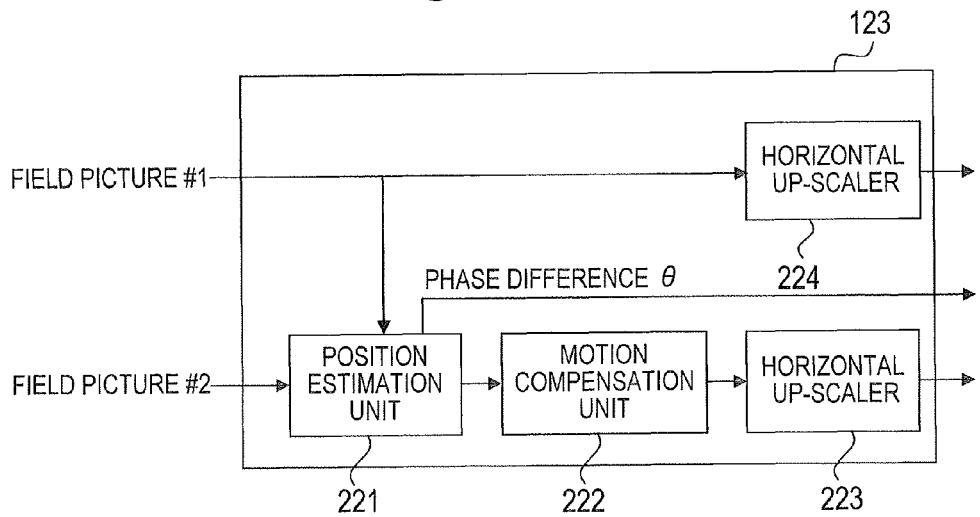
FIG. 2C is a block diagram illustrating a horizontal up-scaler according to the first embodiment of this invention.

FIG. 2C is a block diagram illustrating the horizontal up-scaler 123 according to the first embodiment of this invention.

A configuration of the horizontal up-scaler 123 illustrated in FIG. 2C is merely an example. The horizontal up-scaler 123 illustrated in FIG. 2C has a function for extracting a phase difference caused by the motion of a subject between a plurality of images to thereby increase the resolution.

The horizontal up-scaler 123 includes a position estimation unit 221, a motion compensation unit 222, a horizontal up-scaler 223, and a horizontal up-scaler 224. The horizontal up-scaler 123 illustrated in FIG. 2C receives inputs of two images (field picture #1 and field picture #2), performs motion compensation between the two field pictures, and outputs the two field pictures.

It should be noted that the two field pictures are images acquired from the encoded image data continuously received by the receiver 121. It should be noted that the field picture #2 may be the field picture received earlier than the field picture #1 or may be the field picture received later than the field picture #2.

Further, the horizontal up-scaler 123 is connected to a buffer or the like, and stores one of the field picture #1 and the field picture #2 that is received earlier in the buffer connected to the horizontal up-scaler 123. Then, the field picture received earlier is processed together with the field picture received later.

In the first embodiment, the horizontal up-scaler 123 and the super resolution unit 124 increase the resolution of the field picture #1.

The position estimation unit 221 first acquires respective sampling positions of pixels included in the images (field picture #1 and field picture #2) decoded by the decoder 122. Then, the position estimation unit 221 compares the sampling positions between the pixels of the field picture #1 and the pixels of the field picture #2 to thereby estimate the position of a pixel of the field picture #1 that corresponds to a pixel of the field picture #2. Then, a sampling phase difference θ for each pixel is obtained based on the estimated position.

Subsequently, the motion compensation unit 222 uses the sampling phase difference θ obtained by the position estimation unit 221 to thereby motion-compensate the image of the field picture #2 in order to eliminate a positional deviation.

Then, the horizontal up-scaler 224 increases the number of pixels in the horizontal direction of the image (field picture #1) whose resolution is to be increased. Further, the horizontal up-scaler 223 increases the number of pixels in the horizontal direction of the other image (field picture #2).

The position estimation unit 221 employs the method disclosed in Shigeru ANDO "A Velocity Vector Field Measurement System Based on Spatio-Temporal Image Derivative", Papers of Measurement Automatic Control Academic Society, pp. 1330-1336, Vol. 22, No. 12, 1986 or Hiroyuki KOBAYASHI et al. "Calculation Method of a Phase-Only Correlation Function for Images Based on Discrete Cosine Transform", IEICE Technical Report ITS2005-92, IE2005-299 (2006-02), pp. 73-78.

The horizontal up-scaler 224 and the horizontal up-scaler 223 have the same functions as the horizontal down-scaler 102 illustrated in FIG. 2A or 2B in order to increase the number of pixels in the horizontal direction. In the horizontal down-scaler 102 according to the first embodiment, the integer m and the integer n of the conversion rate are set so as to satisfy m<n, while in the horizontal up-scaler 224 and the horizontal up-scaler 223 according to the first embodiment, the integer m and the integer n of the conversion rates are set so as to satisfy m>n.

The cut-off frequencies and the conversion rates used by the horizontal up-scaler 224 and the horizontal up-scaler 223 according to the first embodiment are set in advance by the administrator or the like. The administrator or the like sets the cut-off frequencies and the conversion rates so that the aliasing components remain without an overlap between the respective aliasing components along the horizontal direction and the vertical direction of the field picture after the processings are performed by the horizontal up-scaler 224 and the horizontal up-scaler 223.

In a case where the horizontal up-scaler 224 and the horizontal up-scaler 223 have the same function as the horizontal down-scaler 102 illustrated in FIG. 2A, the administrator or the like sets the number (m) of interpolation low-pass filter units 201 so that the number of pixels in the horizontal direction increases. Further, in a case where the horizontal up-scaler 224 and the horizontal up-scaler 223 have the same function as the horizontal down-scaler 102 illustrated in FIG. 2B, the administrator or the like sets the values of the integer m used by the upsampling unit 203 and the integer n used by the downsampling unit 205 so that the number of pixels in the horizontal direction increases.

It should be noted that in a case where the super resolution unit 124 increases the resolution of only one field picture #1, the horizontal up-scaler 123 does not need to include the position estimation unit 221, the motion compensation unit 222, and the horizontal up-scaler 223. In other words, in the case where the super resolution unit 124 increases the resolution of only one field picture #1, the horizontal up-scaler 123 may be the same as the horizontal down-scaler 102 illustrated in FIG. 2A or 2B.

The super resolution unit 124 performs a processing for increasing the resolution of the image transmitted from the horizontal up-scaler 123. The super resolution unit 124 according to the first embodiment has the two images (field picture #1 and field picture #2) transmitted thereto from the horizontal up-scaler 123, but the super resolution unit 124 according to this invention may have one image transmitted thereto.

Further, the field picture transmitted to the super resolution unit 124 may include a brightness component and two color-difference components, and may include a red component, a green component, and a blue component. The super resolution unit 124 according to this embodiment may have a function of determining whether or not to execute a super resolution processing (in other words, processing for removing the aliasing component) for each of the above-mentioned components and retain parameters used for the determination.

Specifically, in a case where the super resolution unit 124 determines whether or not to remove the aliasing component based on the brightness component or the color-difference component, the super resolution unit 124 may retain a function of determining the brightness component or the color-difference component for each pixel included in the field picture. Further, the super resolution unit 124 may retain a function of determining whether or not to remove the aliasing component of the pixels of any one of the brightness component and the color-difference component based on the parameters stored in the memory or the like included in the image transmission device 100.

Figure 3:
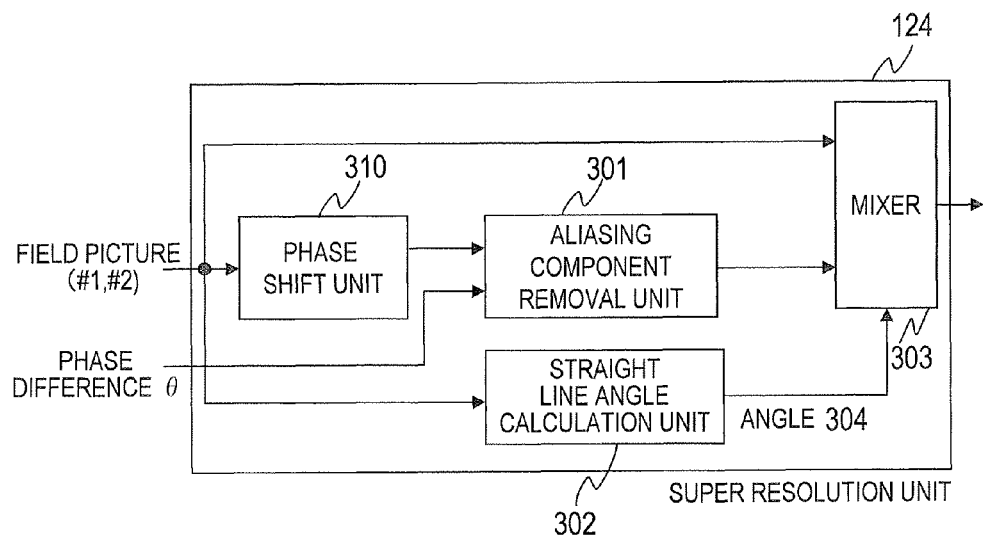
FIG. 3 is a block diagram illustrating a first configuration example of a super resolution unit according to the first embodiment of this invention.
Figure 8:
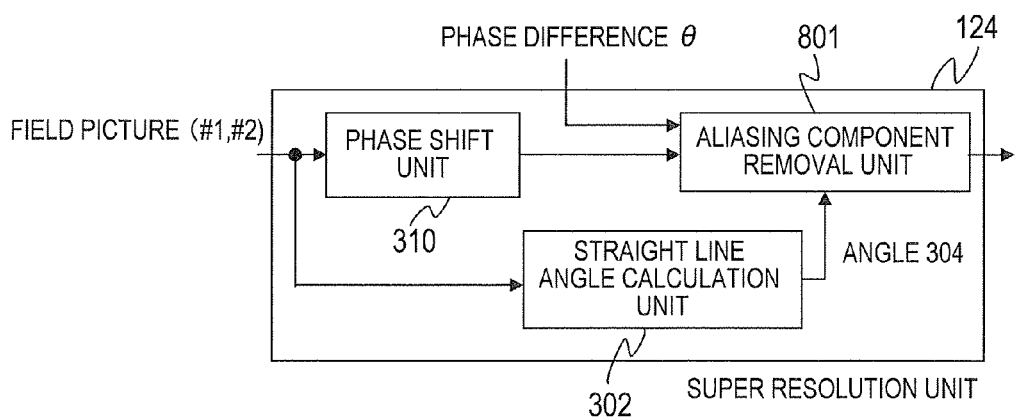
FIG. 8 is a block diagram illustrating a second configuration example of the super resolution unit according to the first embodiment of this invention.

The super resolution unit 124 according to the first embodiment has the following function of FIG. 3 or 8.

FIG. 3 is a block diagram illustrating a first configuration example of the super resolution unit 124 according to the first embodiment of this invention.

The super resolution unit 124 includes an aliasing component removal unit 301, a straight line angle calculation unit 302, a mixer 303, and a phase shift unit 310.

The super resolution unit 124 illustrated in FIG. 3 receives inputs of the two field pictures (field picture #1 and field picture #2). The field picture #1 and the field picture #2 transmitted from the horizontal up-scaler 123 are input to the phase shift unit 310. Further, the field picture #1 transmitted from the horizontal up-scaler 123 is input to the straight line angle calculation unit 302 and the mixer 303. In addition, the sampling phase difference θ transmitted from the horizontal up-scaler 123 is input to the aliasing component removal unit 301.

The phase shift unit 310 generates a field picture obtained by shifting a phase of the input field picture by a fixed amount. In this embodiment, the phase shift unit 310 employs a method of generating four field pictures in total by respectively branching the received two field pictures due to the shifting of the phases of the field pictures by the fixed amount.

Specifically, the phase shift unit 310 according to this embodiment includes a π/2-phase shifter and a delay device. The π/2-phase shifter shifts the phase of one of the branched field pictures by π/2. Then, the delay device delays the other one of the branched field pictures by a delay amount caused by the processing performed by the π/2-phase shifter to thereby compensate the other one of the branched field pictures.

The phase shift unit 310 generates the field picture #1 (field picture #A) whose phase is shifted by π/2 by the π/2-phase shifter, the field picture #1 (field picture #B) whose delay caused by the π/2-phase shifter is compensated by the delay device, the field picture #2 (field picture #C) whose phase is shifted by π/2 by the π/2-phase shifter, and the field picture #2 (field picture #D) whose delay caused by the π/2-phase shifter is compensated by the delay device (see, for example, JP 2009-017242 A).

Then, the phase shift unit 310 transmits the generated four field pictures #A to #D to the aliasing component removal unit 301.

The aliasing component removal unit 301 removes all the aliasing components in a frequency spectrum based on the images (field picture #A to field picture #D) transmitted from the phase shift unit 310 and the sampling phase difference θ for each pixel transmitted from the position estimation unit 221 of the horizontal up-scaler 123. With this operation, the aliasing component removal unit 301 extracts only the original component of the field picture #1 based on the field picture #A to the field picture #D.

The aliasing component removal unit 301 of the super resolution unit 124 according to the first configuration example employers a method of removing the aliasing components along a moving direction within the image based on positional differences of the subject included in a plurality of field pictures (see, for example, JP 2009-017242 A). With this method, the aliasing component removal unit 301 transmits the original component of the field picture #1 to the mixer 303.

The straight line angle calculation unit 302 calculates an orientation (angle 304) of a straight line or an edge displayed in the field picture (field picture #1) transmitted from the horizontal up-scaler 123 for each of the pixels of the field picture #1. A method of calculating the orientation (angle 304) of the straight line or the edge for each of the pixels includes, for example, a conventional technologies such as Hough transform.

The mixer 303 composites the image (including aliasing component) transmitted from the horizontal up-scaler 123 and the image (excluding aliasing component) transmitted from the aliasing component removal unit 301 based on the angle 304 transmitted from the straight line angle calculation unit 302. Specifically, based on a ratio determined based on the angle 304, the field picture #1 and the field picture #2 are composited for each of the pixels. Then, the mixer 303 outputs one field row, in other words, the field picture.

It should be noted that the super resolution unit 124 may be connected to the buffer. Then, the aliasing component removal unit 301 may temporarily store the received field picture or sampling phase difference θ in the buffer in order to remove the aliasing component of the pixel corresponding to the received sampling phase difference θ. Further, the mixer 303 may temporarily store the received angle 304, the field picture #1, or the field picture #1 from which the aliasing component has been removed in the buffer in order to composite the pixels of the field picture #1 and the pixels of the field picture #1 from which the aliasing component has been removed corresponding to the received angle 304.

Further, the super resolution unit 124 according to the first embodiment uses two field pictures to thereby increase the resolution of one field picture, but the super resolution unit 124 according to this invention may use one field picture to thereby increase the resolution of one field picture. In the case of using one field picture, the phase shift unit 310 of the super resolution unit 124 is unnecessary, and the input of the sampling phase difference θ to the aliasing component removal unit 301 is also unnecessary.

Further, the super resolution unit 124 according to the first configuration example may determine whether or not to remove the aliasing component of the pixel having which of the brightness component and the color-difference component, and then in accordance with the determination result, cause the mixer 303 to remove the aliasing component of each of the pixels.

Figure 4:
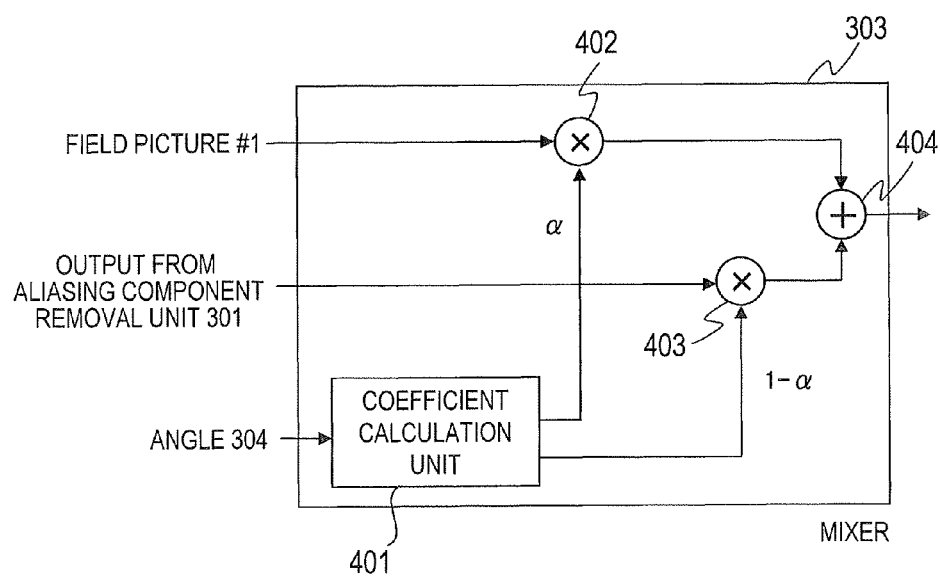
FIG. 4 is a block diagram illustrating a mixer according to the first embodiment of this invention.

FIG. 4 is a block diagram illustrating the mixer 303 according to the first embodiment of this invention.

The mixer 303 includes a coefficient calculation unit 401, a multiplier 402, a multiplier 403, and an adder 404. The multiplier 402 multiplies each of the pixels of the input field picture #1 by a coefficient α(whose range is 0 to 1) corresponding to each of the pixels, and transmits the multiplication results to the adder 404. Further, the multiplier 403 multiplies each of the pixels of the field picture #1 of only the original component transmitted from the aliasing component removal unit 301 by a coefficient (1−α) corresponding to each of the pixels, and transmits the multiplication results to the adder 404.

The adder 404 adds the respective pixels transmitted from the multiplier 402 and the multiplier 403, and transmits the addition result to the display unit 125 or the transmitter 126. The coefficient calculation unit 401 generates the coefficient α and the coefficient (1−α) by using the angle 304 transmitted from the straight line angle calculation unit 302. Then, the coefficient calculation unit 401 transmits the coefficient α to the multiplier 402, and transmits the coefficient (1−α) to the multiplier 403.

The field picture #1 input to the multiplier 402 includes the aliasing component, and the field picture #1 input to the multiplier 403 is of only the original component. Therefore, by adding the aliasing component and the original component based on the value of the coefficient α, the super resolution unit 124 according to this embodiment can acquire a higher-resolution field picture.

Hereinafter, referring to FIGS. 5A to 5C, specific examples of the coefficient calculation unit 401 and the coefficient α are described.

FIG. 5A is an explanatory diagram illustrating the angle 304 according to the first embodiment of this invention.

FIG. 5A illustrates an image expressing an oblique line with the horizontal direction of the image indicated by an x-axis and the vertical direction of the image indicated by a y-axis. The angle 304 is 0 (rad) if the oblique line is parallel with the horizontal direction (x-axis) and π/2 (rad) if the oblique line is parallel with the vertical direction (y-axis). The angle between the horizontal direction and the oblique line is indicated by a deviation (whose range is 0 to π/2) from the x-axis illustrated in FIG. 5A.

FIG. 5B is an explanatory diagram illustrating a spatial frequency spectrum according to the first embodiment of this invention.

The spatial frequency spectrum (in other words, frequency spectrum) of FIG. 5B is expressed by a map with the horizontal axis representing a horizontal frequency μ and the vertical axis representing a vertical frequency ν. The image illustrated in FIG. 5A is converted into the spatial frequency spectrum illustrated in FIG. 5B by Fourier transform.

A specific example of a case where the angle 304 ranges from 0 to n/2 rad is described below. As the value of the angle 304 of FIG. 5A becomes smaller, in other words, is closer to 0 rad, the oblique line of FIG. 5A is converted into a point included in an area closer to the axis of the vertical frequency ν than the axis of the horizontal frequency μ.

Further, as the value of the angle 304 is closer to π/2 rad (more parallel with the vertical direction), on the spatial frequency spectrum, the oblique line of FIG. 5A is converted into a point included in an area closer to the axis of the horizontal frequency p than the axis of the vertical frequency ν.

Area (2) illustrated in FIG. 5B is an area into which the angle 304 is converted if the angle 304 is closer to π/4 rad.

In other words, as the oblique line of FIG. 5A becomes more parallel with the x-axis (as the image becomes closer to the horizontal line), the oblique line of FIG. 5A is more likely to be converted into area (1) illustrated in FIG. 5B. In other words, as the oblique line of FIG. 5A becomes more parallel with the y-axis (as the image becomes closer to the vertical line), the oblique line of FIG. 5A is more likely to be converted into area (3) illustrated in FIG. 5B.

FIG. 5C is an explanatory diagram illustrating a correspondence between the angle 304 and the coefficient α according to the first embodiment of this invention.

The coefficient α is determined by the coefficient calculation unit 401. If the value of the coefficient α is 0.0, the outputs from the adder 404 include all the outputs from the aliasing component removal unit 301, in other words, the original components. Further, if the value of the coefficient α is a value closer to 1.0, the outputs from the adder 404 include a larger proportion of the image (field picture #1) from which the aliasing component has not been removed. In other words, if the value of the coefficient α is a value closer to 1.0, the outputs from the adder 404 exhibit a smaller effect of the removal of the aliasing component and include a larger number of aliasing components.

As described above, in order to remove noise from the image, it is desired that the image transfer system remove the aliasing components along the horizontal direction and leave the aliasing components along the vertical direction.

The coefficient calculation unit 401 of the super resolution unit 124 according to the first configuration example sets the coefficient α to a value closer to 1 as the angle 304 has a smaller value because more aliasing components along the vertical direction are included as the angle 304 has a smaller value. This enables the adder 404 to output the image in which the aliasing components along the vertical direction are left.

Further, the coefficient calculation unit 401 of the super resolution unit 124 according to the first configuration example sets the coefficient α to a value closer to 0 as the angle 304 has a larger value because more aliasing components along the horizontal direction are included as the angle 304 has a larger value. This enables the adder 404 to output the image in which the aliasing components along the horizontal direction have been removed.

Item (1) illustrated in FIG. 5C is the angle 304 being 0 to 3π/16 rad, and indicates area (1) of FIG. 5B. Further, item (2) illustrated in FIG. 5C is the angle 304 being 3π/16 rad to π/4 rad, and indicates area (2) of FIG. 5B. Further, item (3) illustrated in FIG. 5C is the angle 304 being π/4 rad to π/2 rad, and corresponds to area (3) of FIG. 5B.

In item (1) of FIG. 5C, the coefficient α is 1, and in item (2), the coefficient α is 0.5. Further, in item (3) of FIG. 5C, the coefficient α is 0. The correspondence between the angle 304 and the coefficient α is set in advance by the administrator or the like and retained by the coefficient calculation unit 401.

Because the correspondence between the angle 304 and the coefficient α illustrated in FIG. 5C is retained by the coefficient calculation unit 401, the aliasing component that has occurred in area (1) of FIG. 5B is not removed, the aliasing component that has occurred in area (2) of FIG. 5B is weakened, and the aliasing component that has occurred in area (3) of FIG. 5B is removed.

Next, referring to FIGS. 6A to 6D and FIGS. 7A to 7D, an image generated by the image transfer system according to this invention performing a processing for increasing the resolution is described by using the frequency spectrum.

FIGS. 6A to 6D illustrate frequency spectrums of outputs from the respective processing units, which are exhibited in such a processing that the horizontal down-scaler 102 reduces the number of pixels (lowers the resolution) in the horizontal direction of the image on the conditions of m=2 and n=3. In FIGS. 6A to 6D, the horizontal down-scaler 102 is of the oversampling type illustrated in FIG. 2B, and includes the upsampling unit 203, the interpolation low-pass filter unit 204, and the downsampling unit 205.

In diagrams illustrated in FIGS. 6A to 6D, the horizontal axis represents the horizontal frequency μ, the vertical axis represents the vertical frequency ν, and the black circles represent horizontal-direction sampling positions (frequencies) 600. Further, the sampling frequency in the horizontal direction is a frequency of every μs, and the sampling frequency in the vertical direction is a frequency of every vs.

Figure 6A:
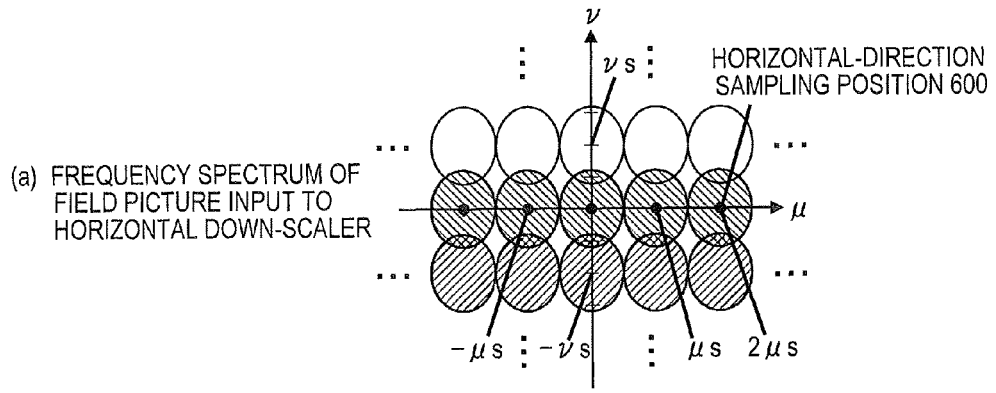
FIG. 6A is an explanatory diagram illustrating a frequency spectrum of image input to the horizontal down-scaler according to the first embodiment of this invention.

FIG. 6A is an explanatory diagram illustrating the frequency spectrum of the image input to the horizontal down-scaler 102 according to the first embodiment of this invention.

The frequency spectrum illustrated in FIG. 6A indicates the field picture input to the horizontal down-scaler 102. It is assumed that the vertical frequency components of the field picture include frequency components equal to or higher than the Nyquist frequency (vs/2) in the vertical direction accompanying interlacing. Further, it is assumed that the horizontal frequency components do not include the frequency components equal to or higher than the Nyquist frequency (vs/2).

In order to scale down the field picture output from the input unit 101 by 2/3 times in the horizontal direction, the horizontal down-scaler 102 causes the upsampling unit 203 to perform 2-times upsampling in the horizontal direction, causes the interpolation low-pass filter unit 204 to perform filtering, and causes the downsampling unit 205 to perform 1/3-times downsampling.

Figure 6B:
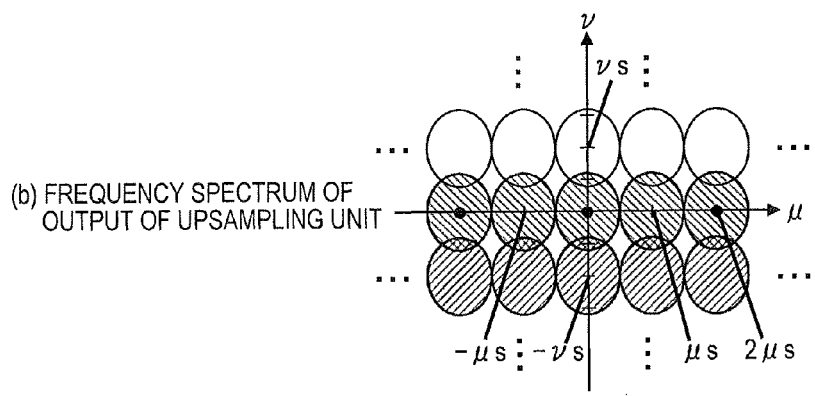
FIG. 6B is an explanatory diagram illustrating a frequency spectrum of output from an upsampling unit of the horizontal down-scaler according to the first embodiment of this invention.

FIG. 6B is an explanatory diagram illustrating the frequency spectrum of the output from the upsampling unit 203 of the horizontal down-scaler 102 according to the first embodiment of this invention.

The frequency spectrum illustrated in FIG. 6B indicates the output from the upsampling unit 203 of the horizontal down-scaler 102 on the condition of m=2. As illustrated in FIG. 6B, as a result of the processing performed by the upsampling unit 203, the intervals between the horizontal-direction sampling positions illustrated in FIG. 6A widen from μs to 2 μs.

Figure 6C:
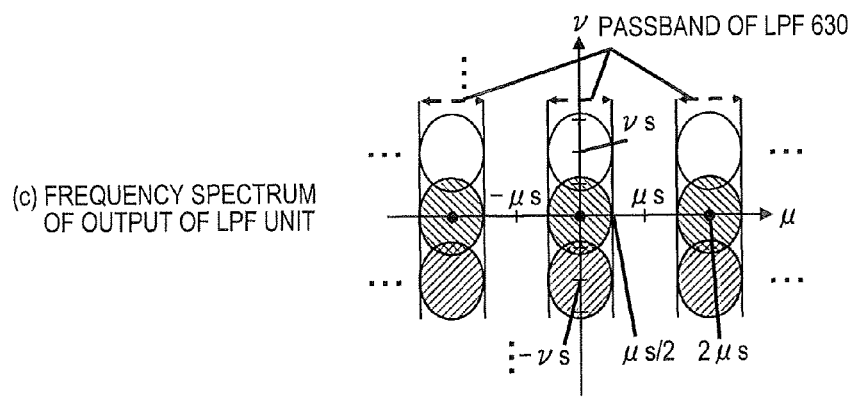
FIG. 6C is an explanatory diagram illustrating a frequency spectrum of output from an interpolation low-pass filter unit of the horizontal down-scaler according to the first embodiment of this invention.

FIG. 6C is an explanatory diagram illustrating the frequency spectrum of the output from the interpolation low-pass filter unit 204 of the horizontal down-scaler 102 according to the first embodiment of this invention.

The frequency spectrum illustrated in FIG. 6C indicates the output from the interpolation low-pass filter unit 204 of the horizontal down-scaler 102. The cut-off frequency retained by the interpolation low-pass filter unit 204 of the horizontal down-scaler 102 according to the first embodiment is a value larger than μs/3 and smaller than 2 μs/3. A passband 630 is the frequency band that has been left by the interpolation low-pass filter unit 204 using the cut-off frequency.

The interpolation low-pass filter unit 204 of the horizontal down-scaler 102 leaves only frequencies in the vicinities of the sampling frequencies (in FIG. 6C, μ=0, i=2 μs, and the like) within the frequency spectrum along the horizontal direction illustrated in FIG. 6B, and deletes the other frequency components. In FIG. 6C, the cut-off frequency is μs/2.

Figure 6D:
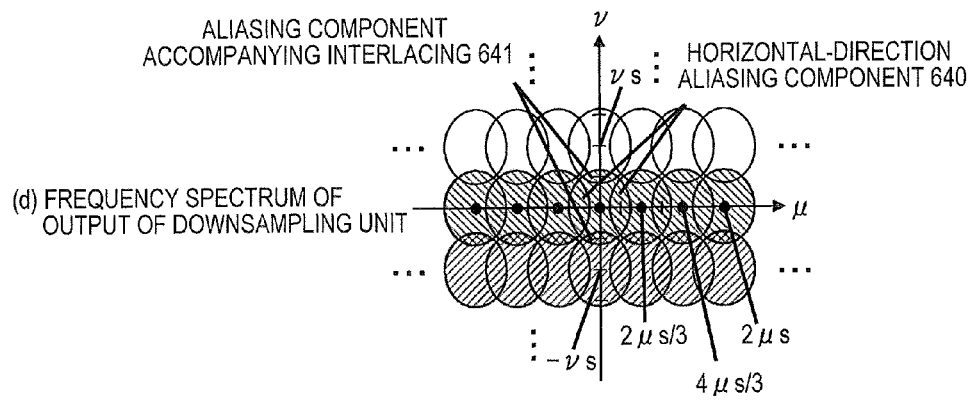
FIG. 6D is an explanatory diagram illustrating a frequency spectrum of output from a downsampling unit of the horizontal down-scaler according to the first embodiment of this invention.

The cut-off frequency for the interpolation low-pass filter unit 204 is set in advance by the administrator or the like to a value that does not cause an overlap between a vertical-direction aliasing component 641 accompanying the interlacing and a horizontal-direction aliasing component 640 in the frequency spectrum of the output from the downsampling unit 205 illustrated in FIG. 6D. Then, the set cut-off frequency is retained by the interpolation low-pass filter unit 204.

FIG. 6D is an explanatory diagram illustrating the frequency spectrum of the output from the downsampling unit 205 of the horizontal down-scaler 102 according to the first embodiment of this invention.

The frequency spectrum illustrated in FIG. 6D indicates the output from the downsampling unit 205 of the horizontal down-scaler 102 on the condition of n=3. As illustrated in FIG. 6D, the sampling frequency in the horizontal direction is set by the downsampling unit 205 to a frequency of every μ' (=2 μs/3). The frequency components of the output from the interpolation low-pass filter unit 204 are arrayed in order at the intervals of the sampling frequency. As a result, the field picture is scaled down in the horizontal direction by the frequency band filtered by the interpolation low-pass filter unit 204.

Overlaps between ellipses that are arrayed in parallel on the v-axis among ellipses of the frequency spectrum illustrated in FIG. 6D indicate the vertical-direction aliasing component 641 accompanying the interlacing. Further, overlaps between ellipses that are arrayed in parallel with the μ-axis indicate the aliasing components 640 along the horizontal direction.

It should be noted that the administrator or the like sets the cut-off frequency for the interpolation low-pass filter unit 204 to such a value within a range larger than μs/3 and smaller than 2 μs/3 as to avoid an overlap between the vertical-direction aliasing components 641 accompanying the interlacing and the aliasing components 640 along the horizontal direction. This causes the aliasing component 640 to occur in the vicinity of the horizontal frequency μs/3 without causing an overlap with the vertical-direction aliasing component 641 accompanying the interlacing.

As described above, the administrator or the like sets such a cut-off frequency and a conversion rate as to leave the aliasing components, after the processing performed by the horizontal down-scaler 102, without an overlap between the aliasing components along the horizontal direction of the field picture and the aliasing components along the vertical direction thereof.

FIGS. 7A to 7D illustrate frequency spectrums for the case where the horizontal up-scaler 123 increases the resolution (increasing the number of pixels) in the horizontal direction on the conditions of m=3 and n=2. In FIGS. 7A to 7D, in the same manner as the horizontal down-scaler 102, the horizontal up-scaler 123 is of the oversampling type illustrated in FIG. 2B, and includes the upsampling unit 203, the interpolation low-pass filter unit 204, and the downsampling unit 205.

In diagrams illustrated in FIGS. 7A to 7D, the horizontal axis represents the horizontal frequency μ, the vertical axis represents the vertical frequency v, and the black circles represent horizontal-direction sampling positions (frequencies) 700.

Figure 7A:
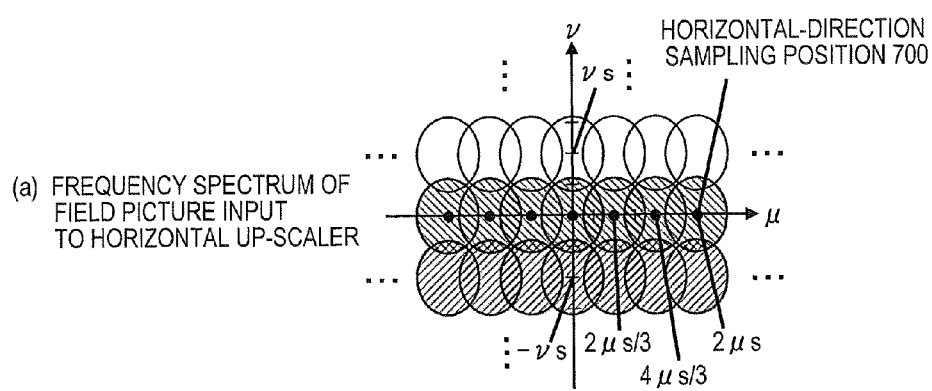
FIG. 7A is an explanatory diagram illustrating a frequency spectrum of an image input to the horizontal up-scaler according to the first embodiment of this invention.

FIG. 7A is an explanatory diagram illustrating the frequency spectrum of the image input to the horizontal up-scaler 123 according to the first embodiment of this invention.

The frequency spectrum illustrated in FIG. 7A indicates the frequency spectrum of the image input when the image transmitted from the horizontal down-scaler 102 is input to the horizontal up-scaler 123 via the encoder 103, the transmitter 104, the transmission line 110, the receiver 121, and the decoder 122. Therefore, in this embodiment, the frequency spectrum illustrated in FIG. 7A is the same as the frequency spectrum transmitted from the horizontal down-scaler 102 which is illustrated in FIG. 6D.

In order to scale up the image by 3/2-times in the horizontal direction, the horizontal up-scaler 123 causes the upsampling unit 203 to perform 3-times upsampling in the horizontal direction, causes the interpolation low-pass filter unit 204 to perform filtering, and causes the downsampling unit 205 to perform 1/2-times downsampling.

Figure 7B:
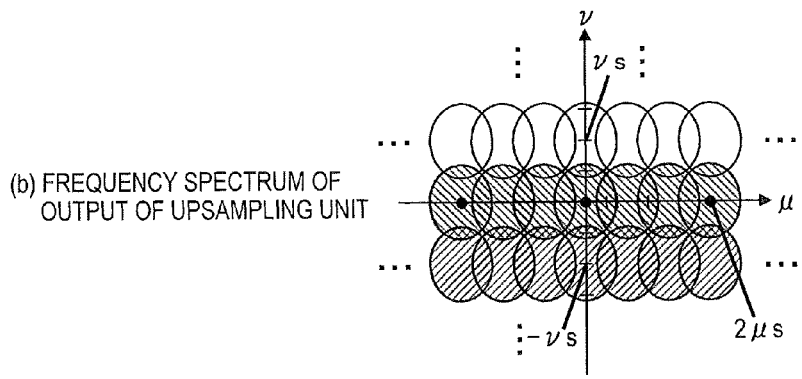
FIG. 7B is an explanatory diagram illustrating a frequency spectrum of output from an upsampling unit of the horizontal up-scaler according to the first embodiment of this invention.

FIG. 7B is an explanatory diagram illustrating the frequency spectrum of the output from the upsampling unit 203 of the horizontal up-scaler 123 according to the first embodiment of this invention.

The frequency spectrum illustrated in FIG. 7B indicates the output from the upsampling unit 203 of the horizontal up-scaler 123 on the condition of m=3. As illustrated in FIG. 7B, as a result of the processing performed by the upsampling unit 203, the intervals between the horizontal-direction sampling positions illustrated in FIG. 7A widens from 2 μs/3 to 2 μs.

Figure 7C:
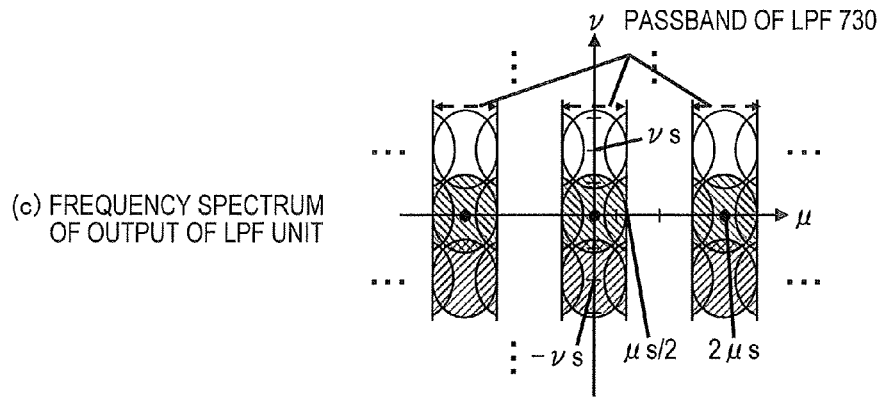
FIG. 7C is an explanatory diagram illustrating a frequency spectrum of output from an interpolation low-pass filter unit of the horizontal up-scaler according to the first embodiment of this invention.

FIG. 7C is an explanatory diagram illustrating the frequency spectrum of the output from the interpolation low-pass filter unit 204 of the horizontal up-scaler 123 according to the first embodiment of this invention.

The frequency spectrum illustrated in FIG. 7C indicates the output from the interpolation low-pass filter unit 204 of the horizontal up-scaler 123. The cut-off frequency for the interpolation low-pass filter unit 204 of the horizontal up-scaler 123 according to the first embodiment is μs/2. Further, the interpolation low-pass filter unit 204 of the horizontal up-scaler 123 leaves only frequencies (passband 730) in the vicinities of the sampling frequencies (in FIG. 7C, μ=0, μ=2 μs, and the like) within the frequency spectrum along the horizontal direction illustrated in FIG. 7B, and deletes the other frequency components.

In the same manner as in the case of the horizontal down-scaler 102, the cut-off frequency for the interpolation low-pass filter unit 204 of the horizontal up-scaler 123 is set in advance by the administrator or the like and retained by the interpolation low-pass filter unit 204. The administrator or the like sets such a cut-off frequency and a conversion rate as to leave the aliasing components, after the processing performed by the horizontal up-scaler 123, without an overlap between the aliasing components along the horizontal direction of the field picture and the aliasing components along the vertical direction thereof.

Figure 7D:
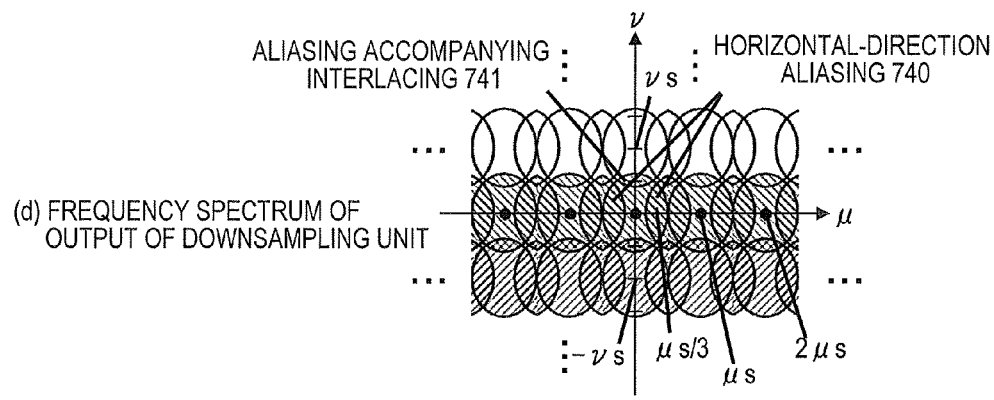
FIG. 7D is an explanatory diagram illustrating a frequency spectrum of output from a downsampling unit of the horizontal up-scaler according to the first embodiment of this invention.

FIG. 7D is an explanatory diagram illustrating the frequency spectrum of the output from the downsampling unit 205 of the horizontal up-scaler 123 according to the first embodiment of this invention.

The frequency spectrum illustrated in FIG. 7D indicates the output from the downsampling unit 205 of the horizontal up-scaler 123 on the condition of n=2. As illustrated in FIG. 7D, the sampling frequency in the horizontal direction is set by the downsampling unit 205 to a frequency of every μs" (=μs). The frequency components of the output from the interpolation low-pass filter unit 204 are arrayed at the intervals of the set sampling frequency. As a result, the number of pixels in the horizontal direction of the field picture increases.

As illustrated in FIG. 7D, the aliasing components 640 that have occurred in the horizontal down-scaler 102 keep being left in the vicinity of the horizontal frequency μs/3 as aliasing components 740. Further, aliasing components 741 along the vertical direction accompanying the interlacing occur in the same manner as the aliasing components 641. The frequency spectrum illustrated in FIG. 7D is transmitted to the super resolution unit 124.

The super resolution unit 124 generates the output by using the correspondence between the angle 304 and the coefficient α illustrated in FIG. 5C. If the value of the angle 304 is 0 to 3π/16, in other words, if the super resolution unit 124 uses the coefficient α of area (1) on the frequency spectrum illustrated in FIG. 5C, the aliasing components 740 along the horizontal direction are not removed. Further, area (1) illustrated in FIG. 5C includes the aliasing components 741 that have occurred with the progress of the interlacing which is illustrated in FIG. 7D, and hence the aliasing components 741 that have occurred with the progress of the interlacing are not removed if the coefficient α of area (1) is used.

On the other hand, if the value of the angle 304 is π/4 to π/2, in other words, if the super resolution unit 124 uses the coefficient α of area (3) on the frequency spectrum illustrated in FIG. 5C, most of the aliasing components 740 along the horizontal direction are removed. In other words, area (3) illustrated in FIG. 5C includes the aliasing components 740 illustrated in FIG. 7D, and hence most of the aliasing components 740 are removed.

On the other hand, if the value of the angle 304 is 3π/16 to π/4, in other words, if the super resolution unit 124 uses the coefficient α of area (2) on the frequency spectrum illustrated in FIG. 5C, the aliasing components 740 along the horizontal direction decrease.

In order to remove only the aliasing components 740 along the horizontal direction illustrated in FIG. 7D, the coefficient α is set to 1 if the value of the angle 304 is smaller than tan−1(2/3), and the coefficient α is set to 0 if the value of the angle 304 is larger than tan−1(2/3). This enables the super resolution unit 124 to obtain the original frequency spectrum illustrated in FIG. 6A.

The coefficient calculation unit 401 of the super resolution unit 124 according to the first configuration example previously retains the coefficient α and the angle 304 in association with each other as illustrated in FIG. 5C, and sets the coefficient α corresponding to the angle 304 if the field picture #1 is transmitted to the mixer 303. Then, the mixer 303 causes the multiplier 402 and the multiplier 403 to process the set coefficient α the pixels corresponding to the coefficient α. It should be noted that the coefficient calculation unit 401 may be previously supplied with the coefficient α and the angle 304 by the administrator or the like.

According to the above-mentioned first configuration example of the super resolution unit 124, the super resolution unit 124 can remove the aliasing components along the horizontal direction by determining the coefficient α based on the angle 304 of the field picture. In other words, it is possible to change the amount of the aliasing components to remove based on the angle 304. Accordingly, it is possible to acquire a high-resolution image.

FIG. 8 is a block diagram illustrating a second configuration example of the super resolution unit 124 according to the first embodiment of this invention.

The super resolution unit 124 illustrated in FIG. 8 has a different configuration from the super resolution unit 124 illustrated in FIG. 3. The super resolution unit 124 illustrated in FIG. 8 processes a plurality of images as well. The super resolution unit 124 illustrated in FIG. 8 removes the aliasing component based on the angle 304 transmitted from the straight line angle calculation unit 302. In the following description, the same functions as those of the super resolution unit 124 illustrated in FIG. 3 are denoted by the same reference numerals. Further, the descriptions of the same functions as those of the super resolution unit 124 illustrated in FIG. 3 are omitted in order to avoid duplicate description.

The super resolution unit 124 of FIG. 8 includes an aliasing component removal unit 801, the straight line angle calculation unit 302, and the phase shift unit 310.

The aliasing component removal unit 801 receives the sampling phase difference θ transmitted from the horizontal up-scaler 123, the field picture transmitted from the phase shift unit 310, and the angle 304 transmitted from the straight line angle calculation unit 302. Then, the aliasing component removal unit 801 removes the aliasing components 740 along the horizontal direction within the frequency spectrum of the transmitted image based on the sampling phase difference θ and the angle 304, and extracts the original component of the image.

FIG. 9 is a block diagram illustrating configurations of the phase shift unit 310 and the aliasing component removal unit 801 according to the first embodiment of this invention.

The super resolution unit 124 illustrated in FIG. 8 according to the second configuration example includes the phase shift unit 310 and the aliasing component removal unit 801, which are illustrated in FIG. 9.

The phase shift unit 310 includes a phase shifter and a delay device in the same manner as the phase shift unit 310 illustrated in FIG. 3. The phase shift unit 310 illustrated in FIG. 9 receives inputs of an image 900A (field picture #1) and an image 900B (field picture #2).

The phase shift unit 310 illustrated in FIG. 9 causes the phase shifter to convert the image 900A and the image 900B into two images that are different in phase from each other. As a result, the phase shift unit 310 outputs images (921, 922, 923, and 924). It should be noted that the number of images input to the phase shift unit 310 may not only be two but also be three or more.

The aliasing component removal unit 801 includes a coefficient determination unit 910, multipliers (911, 912, 913, and 914), and an adder 915. An image 921 is input to the multiplier 911, an image 922 is input to the multiplier 912, an image 923 is input to the multiplier 913, and an image 924 is input to the multiplier 914.

The image 921 is one of the two field pictures obtained by branching the image 900A, and is a field picture in which a delay that occurs when the other one of the branched field pictures is processed by the π/2-phase shifter is compensated by the delay device. The image 922 is the other one of the two field pictures obtained by branching the image 900A, and is a field picture having a phase shifted by π/2 by the π/2-phase shifter.

Further, the image 923 is one of the two field pictures obtained by branching the image 900B, and is a field picture in which a delay that occurs when the other one of the branched field pictures is processed by the π/2-phase shifter is compensated. The image 924 is the other one of the two field pictures obtained by branching the image 900B, and is a field picture having a phase shifted by π/2 by the π/2-phase shifter.

The coefficient determination unit 910 calculates coefficients (C0, C2, C1, and C3) generated based on the sampling phase difference θ and the angle 304.

The multipliers (911, 912, 913, and 914) of the aliasing component removal unit 801 multiply the respective pixels of the images (921, 922, 923, and 924) output from the phase shift unit 310 by the coefficients (C0, C2, C1, and C3) calculated by the coefficient determination unit 910, respectively, and transmit the multiplication results to the adder 915. The adder 915 adds the pixels transmitted from the multipliers (911, 912, 913, and 914), and transmits the addition result to the display unit 125 or the transmitter 126.

The super resolution unit 124 may be connected to the buffer, and may temporarily store the images (921, 922, 923, and 924), the angle 304, or the sampling phase difference θ in the buffer. In this manner, the coefficients (C0, C2, C1, and C3) may be calculated based on the angle 304 and the sampling phase difference θ corresponding to the images (921, 922, 923, and 924), and the coefficients (C0, C2, C1, and C3) and the images (921, 922, 923, and 924) may be associated with each other.

The coefficient determination unit 910 receives the sampling phase difference θ from the horizontal up-scaler 123. Further, the coefficient determination unit 910 receives the angle 304 from the straight line angle calculation unit 302.

It should be noted that the super resolution unit 124 according to the second configuration example illustrated in FIG. 9 receives the inputs of a plurality of images, but the super resolution unit 124 according to this invention may receive an input of one image.

FIG. 10 is an explanatory diagram illustrating a coefficient calculation method performed by the coefficient determination unit 910 according to the first embodiment of this invention.

FIG. 10 illustrates a method used when the coefficient determination unit 910 included in the super resolution unit 124 according to the second configuration example determines the coefficients (C0, C2, C1, and C3).

Figure 22A:
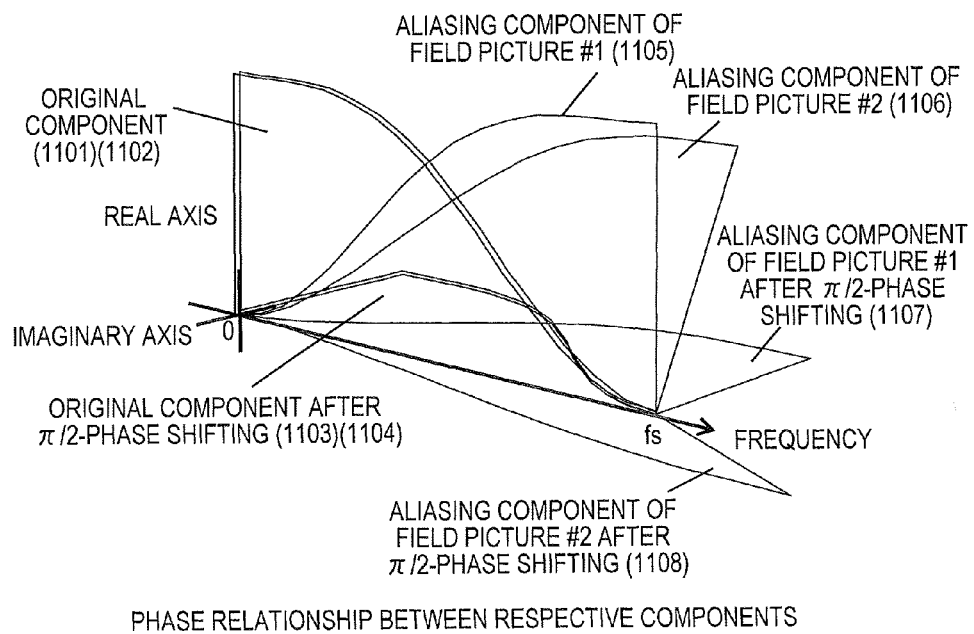
FIG. 22A is an explanatory diagram illustrating frequency spectrums of an image according to the related art.
Figure 22B:
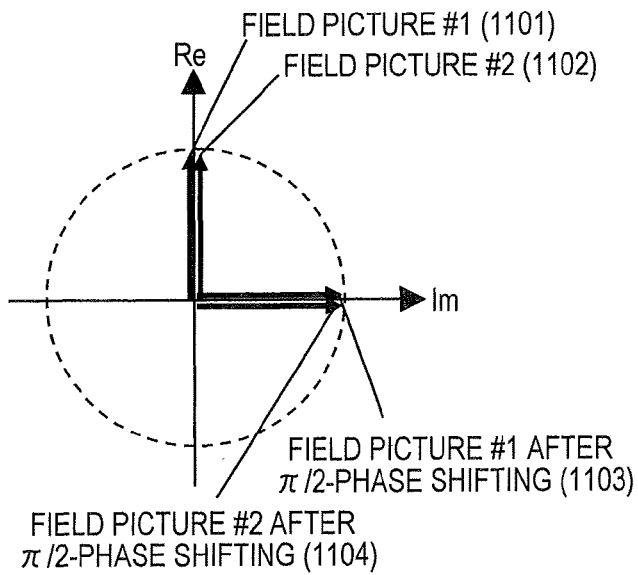
FIG. 22B is an explanatory diagram illustrating original components included in an image according to the related art.
Figure 22C:
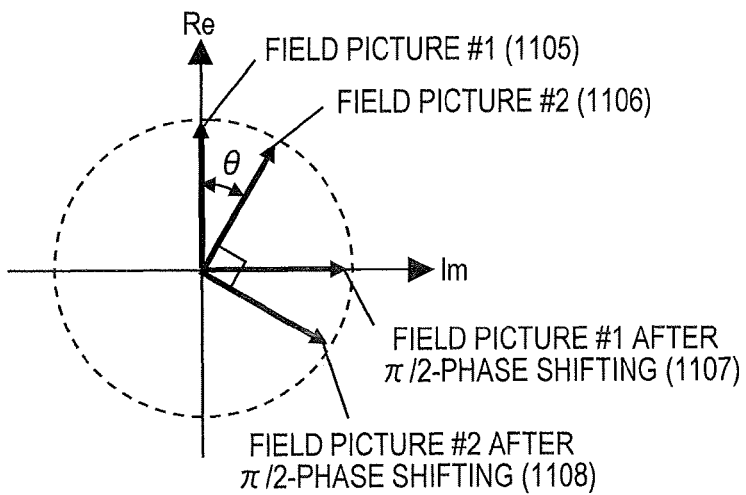
FIG. 22C is an explanatory diagram illustrating aliasing components included in an image according to the related art.

Referring to FIGS. 22B and 22C, a description is made of an outline of the method of determining the coefficients (C0, C2, C1, and C3).

FIG. 22B is an explanatory diagram illustrating original components included in an image according to the related art.

Four vectors illustrated in FIG. 22B represent vectors (1101 and 1102) indicating the original components of the two images (field picture #1 and field picture #2) and vectors (1103 and 1104) obtained as a result of subjecting the original components of the field picture #1 and the field picture #2, respectively, to π/2-phase-shifting.

The vectors (1101 to 1104) represent the original components. The vectors (1101 and 1102) are indicated in parallel with a real axis. The vectors (1101 to 1104) of FIG. 22B correspond to the vectors (1101 to 1104) illustrated in FIG. 22A.

FIG. 22C is an explanatory diagram illustrating the aliasing components included in the image according to the related art.

Four vectors illustrated in FIG. 22C represent the phases of the respective aliasing components obtained after the two field pictures are processed by the horizontal down-scaler 102 and the horizontal up-scaler 123. A vector 1105 is the aliasing component of the field picture #1, and a vector 1107 is the aliasing component of the field picture #1 obtained after the π/2-phase shifting. A vector 1106 is the aliasing component of the field picture #2, and a vector 1108 is the aliasing component of the field picture #2 obtained after the π/2-phase shifting.

The vector 1105 of the aliasing component of the field picture #1 is parallel with the real axis. The vector 1106 of the aliasing component of the field picture #2 is inclined from the real axis by the sampling phase difference θ.

The super resolution unit 124 according to the second configuration example of the first embodiment multiplies the four components illustrated in FIG. 22B respectively by the supplied coefficients (C0, C2, C1, and C3), and acquires the vector sum of the multiplication results. Further, the super resolution unit 124 multiplies the four components illustrated in FIG. 22C respectively by the coefficients (C0, C2, C1, and C3), and acquires the vector sum of the multiplication results.

Therefore, the coefficient determination unit 910 determines the coefficients (C0, C2, C1, and C3) so that the component on the real axis is 1 with the component on an imaginary axis being 0 in FIG. 22B and that the component on the real axis is the coefficient α (whose range is 0 to 1) with the component on the imaginary axis being 0 in FIG. 22C. In other words, the coefficient determination unit 910 determines the value of the coefficient α to thereby adjust the amount of the aliasing components left in the field pictures output from the super resolution unit 124.

As described above, by determining the coefficients (C0, C2, C1, and C3), the super resolution unit 124 according to the first embodiment can realize the increased resolution with the aliasing components removed completely, or with the aliasing components left to some extent, by using only the two field pictures.

It should be noted that the coefficient α used in the super resolution unit 124 of FIG. 8 is determined based on the angle 304 in the same manner as the coefficient α used in the above-mentioned super resolution unit 124 of FIG. 3. In other words, if the value of the coefficient α is 0.0, the aliasing components are removed completely. Further, as the value of the coefficient α becomes closer to 0.0, the aliasing components decreases. If the value of the coefficient α is 1.0, the aliasing components are left completely. This is the same as in the case of the coefficient α used in the above-mentioned super resolution unit 124 of FIG. 3, and the relationship between the angle 304 and the coefficient α is the same as the correspondence indicated in FIG. 5C.

In addition, the super resolution unit 124 of FIG. 8 uses the coefficients (C0, C2, C1, and C3) in order to set the component on the imaginary axis of the vector sum of the original components and the aliasing components of the field picture #1 and the field picture #2 to zero.

The coefficient C0 is a coefficient corresponding to the image 921 output from the phase shift unit 310 (sum of the original component and the aliasing component of the field picture #1 after horizontal up-scaling). Further, the coefficient C1 is a coefficient corresponding to the image 922 output from the phase shift unit 310 (sum of the results of subjecting the original component and the aliasing component of the field picture #1 after horizontal up-scaling respectively to π/2-phase-shifting).

Further, the coefficient C2 is a coefficient corresponding to the image 923 output from the phase shift unit 310 (sum of the original component and the aliasing component of the field picture #2 after horizontal up-scaling). Further, the coefficient C3 is a coefficient corresponding to the image 924 output from the phase shift unit 310 (sum of the results of subjecting the original component and the aliasing component of the field picture #2 after horizontal up-scaling respectively to π/2-phase-shifting).

The coefficient determination unit 910 previously obtains such simultaneous equations as to satisfy the conditions indicated by (a) of FIG. 10 by using the coefficient α, the coefficients (C0, C2, C1, and C3), and the sampling phase difference θ that are described above. As a result, the coefficient determination unit 910 obtains the simultaneous equations indicated by (b) of FIG. 10 from phase relationships among the respective components illustrated in FIG. 22B and FIG. 22C.

The coefficient determination unit 910 determines the coefficient α depending on the angle 304 received from the straight line angle calculation unit 302, and calculates the simultaneous equations indicated by (b) of FIG. 10. In this manner, it is possible to determine the coefficients (C0, C2, C1, and C3).

For example, if the coefficient α=0, in other words, in the case of removing the aliasing components completely, the coefficient determination unit 910 determines the coefficients (C0, C2, C1, and C3) as indicated by (c) of FIG. 10. The table (d) of FIG. 10 indicates the values of the coefficients (C0, C2, C1, and C3) obtained in a case where the sampling phase difference θ is changed from 0 to 2π rad every π/8 rad.

In the case of using the coefficients (C0, C2, C1, and C3) indicated by (d) of FIG. 10, the processing performed by the aliasing component removal unit 801 corresponds to a processing for subjecting the signal of the original field picture #2 to positional estimation with a precision of 1/16 pixel and subjecting the field picture #1 to motion compensation. If the value of the sampling phase difference θ is less than 0 or 2π or more, by using the periodicity of the sin function and cos function, the coefficient determination unit 910 may determine the coefficients (C0, C2, C1, and C3) by adding or subtracting the value of the integral multiple of 2π to/from the value of the sampling phase difference θ so that the sampling phase difference θ falls within the range from 0 to 2π.

As described above, in the same manner as the super resolution unit 124 according to the first configuration example, the super resolution unit 124 according to the second configuration example can change the amount of the aliasing components to be removed depending on the angle 304.

It should be noted that after determining whether or not to remove the aliasing component of the pixel having which of the brightness component and the color-difference component, the super resolution unit 124 according to the second configuration example may cause the aliasing component removal unit 801 to remove the aliasing component of each of the pixels in accordance with the determination result.

Further, the above-mentioned image reception device 120 according to the first embodiment obtains the angle of the straight line or the edge for each image and determines the coefficient α for each of the pixels. However, the image reception device 120 according to this invention may extract arbitrary pixels within the field picture and calculate the angle 304 of the straight line or the edge of the extracted pixels. Then, the image reception device 120 according to this invention may determine the coefficient α based on the calculated angle 304 for the extracted pixels and pixels around the extracted pixels.

As described above, the image transmission device 100 according to the first embodiment scales down the interlaced field picture in the horizontal direction, compresses and encodes the scaled-down image, and transmits the image to the image reception device 120 via the transmission line 110. The image transmission device 100 can reduce the amount of the encoded image data to be transmitted because the field picture is scaled down and then compressed. According to the image transfer system including the image transmission device 100 as described above, it is possible to transmit the video signal having a larger amount of information even if a limitation is placed on the communication band of the transmission line 110.

Further, the image reception device 120 according to the first embodiment receives the encoded image data obtained by the compression and encoding, and decodes the received decoded image data. Then, the image reception device 120 scales up the decoded field picture in the horizontal direction, and obtains the angle 304 of the straight line or the edge in the respective pixels of the scaled-up field picture. Then, the image reception device 120 changes the amount of the aliasing components to be removed based on the calculated angle 304.

The image reception device 120 according to the first embodiment strengthens the extent to which the aliasing components are removed in the straight line or the edge inclined in the vertical direction within the image, and weakens the extent to which the aliasing components are removed in the straight line or the edge inclined in the horizontal direction. As a result, it is possible to remove a larger number of aliasing components along the horizontal direction within the image, and is further possible to leave a larger number of aliasing components along the vertical direction accompanying the interlacing.

Therefore, the image reception device 120 according to the first embodiment can generate a high-resolution field picture from the field picture that has been scaled down and scaled up in the horizontal direction. In addition, most of the aliasing components along the vertical direction can be left even if there is a motion in the subject along the vertical direction, and it is possible to generate a high-resolution field picture exhibiting little image degradation.

It should be noted that the image transfer system according to the first embodiment may be implemented as an image by using a storage device in the transmission line 110 and integrating the image transmission device 100 and the image reception device 120.

Further, with regard to the cut-off frequency and the conversion rate that are used by the horizontal down-scaler 102 and the horizontal up-scaler 123 according to the first embodiment, the cut-off frequency and the conversion rate are determined so that the aliasing components remain without an overlap between the aliasing components along the horizontal direction of the field picture and the aliasing components along the vertical direction thereof after the respective processings. However, in the image transfer system according to this embodiment, the aliasing components along the horizontal direction are removed based on the angle 304 even when there is an overlap between the aliasing components along the horizontal direction of the field picture and the aliasing components along the vertical direction thereof after the processing performed by the horizontal up-scaler 123, which produces an effect of increasing the resolution.

Second Embodiment

On an image transmission device according to a second embodiment of this invention, unlike the image transfer system according to the first embodiment, the conversion rate (in other words, rate between the integer m and the integer η) and the cut-off frequency that are used by a horizontal down-scaler are included in the encoded image data by an encoder. Then, the encoded image data including the conversion rate and the cut-off frequency is transmitted to an image reception device.

An image reception device according to the second embodiment uses a decoder to extract the conversion rate and the cut-off frequency from the received encoded image data. Then, the conversion rate and the cut-off frequency that have been extracted are used to cause a horizontal up-scaler and a super resolution unit to perform the processings. In this manner, an image transfer system according to the second embodiment accurately grasps situations in which the aliasing components occur in the frequency spectrum, and generates a high-resolution image exhibiting little image degradation such as noise.

In the following description, the same functions as the functions included in the above-mentioned image transfer system according to the first embodiment are denoted by the same reference numerals. Further, the duplicate description related to the same functions is omitted.

Figure 11:
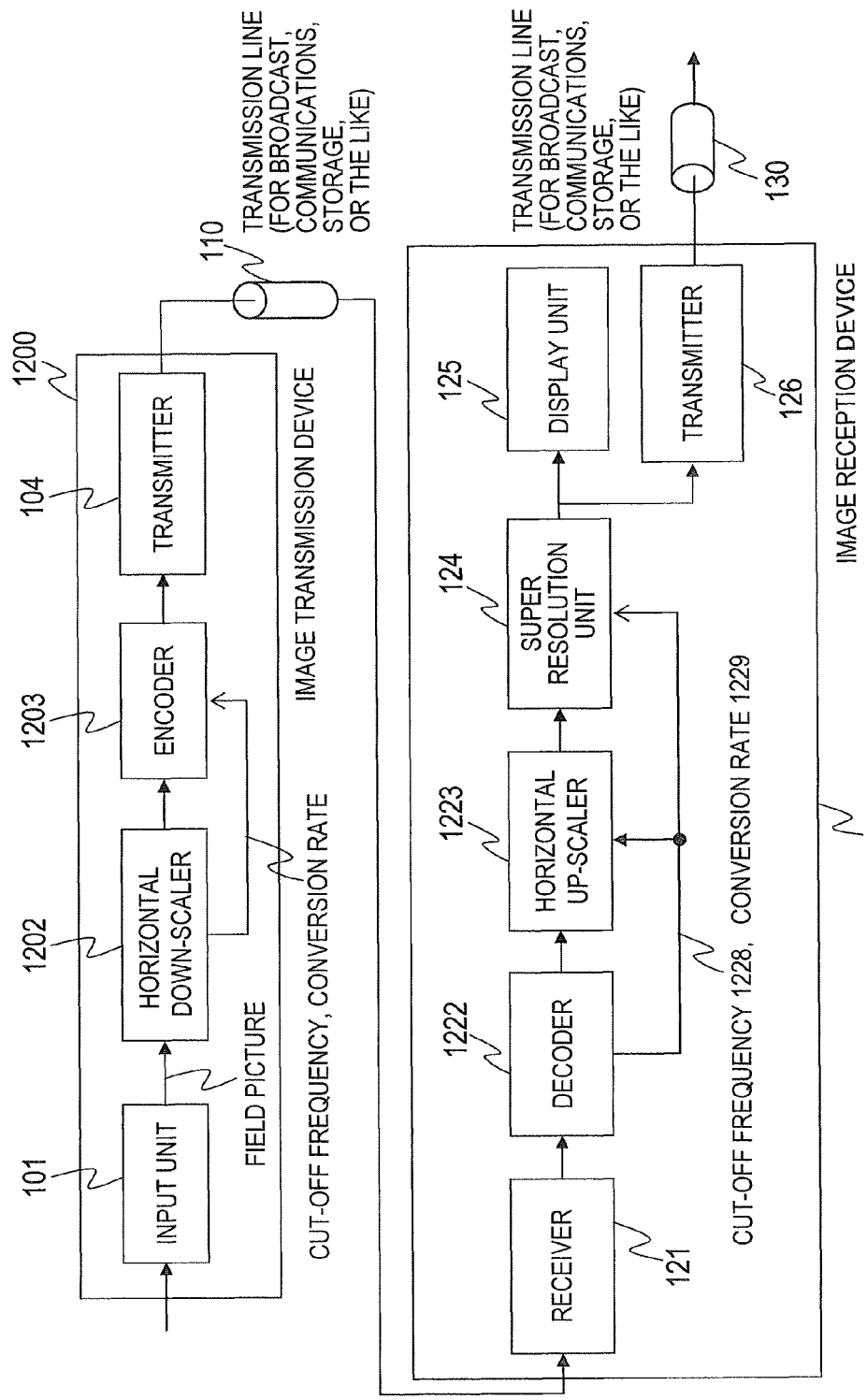
FIG. 11 is a block diagram illustrating an image transfer system according to a second embodiment of this invention.

FIG. 11 is a block diagram illustrating an image transfer system according to the second embodiment of this invention.

The image transfer system according to the second embodiment includes an image transmission device 1200, the transmission line 110, an image reception device 1220, and the transmission line 130. The image transmission device 1200 corresponds to the image transmission device 100 illustrated in FIG. 1. The image reception device 1220 corresponds to the image reception device 120 illustrated in FIG. 1.

The image transmission device 1200 includes the input unit 101, a horizontal down-scaler 1202, an encoder 1203, and the transmitter 104.

In the same manner as in the case of the image transmission device 100 according to the first embodiment, the image transmission device 1200 may be a computer including a processor and a memory, and may implement functions such as the input unit 101, the horizontal down-scaler 1202, the encoder 1203, and the transmitter 104 by programs. Alternatively, the image transmission device 1200 may implement the functions such as the input unit 101, the horizontal down-scaler 1202, the encoder 1203, and the transmitter 104 by elements such as LSIs.

Further, the image transmission device 1200 may include an input device that allows an administrator or the like to input a parameter to be used in the image transmission device 1200.

The horizontal down-scaler 1202 processes the field picture transmitted from the input unit 101. Specifically, the horizontal down-scaler 1202 reduces the number of pixels in the horizontal direction of the image. The horizontal down-scaler 1202 according to the second embodiment uses the same function as the horizontal down-scaler 102 according to the first embodiment, and further outputs the cut-off frequency used when filtering the field picture and the conversion rate of the number of pixels in the horizontal direction.

It should be noted that the horizontal down-scaler 1202 according to the second embodiment reduces the number of pixels in the horizontal direction by the conversion rate n/m (n and m are integers; n<m). In other words, in the case where the horizontal down-scaler 1202 is of the oversampling type illustrated in FIG. 2B, the upsampling unit 203 uses the integer n to increase the sampling frequency of the field picture, and the downsampling unit 205 uses the integer m to reduce the sampling frequency of the field picture.

The encoder 1203 generates the encoded image data by compressing the image scaled down by the horizontal down-scaler 1202. Further, the encoder 1203 performs the encoding by multiplexing the cut-off frequency and the conversion rate that have been transmitted from the horizontal down-scaler 1202. In this manner, the cut-off frequency and the conversion rate that have been encoded are included in the encoded image data.

Examples of a method used for multiplexing the cut-off frequency and the conversion rate into the encoded image data include a method of performing the multiplexing into a user data area of supplementary enhancement information (SEI) on a stream syntax defined by a video encoding based on H.264/AVC.

The image reception device 1220 includes the receiver 121, a decoder 1222, a horizontal up-scaler 1223, the super resolution unit 124, the display unit 125, and the transmitter 126.

In the same manner as in the case of the image reception device 120 according to the first embodiment, the image reception device 1220 may be a computer including a processor and a memory, and may implement functions such as the receiver 121, the decoder 1222, the horizontal up-scaler 1223, the super resolution unit 124, the display unit 125, and the transmitter 126 by programs. Further, the image reception device 1220 may implement the functions such as the receiver 121, the decoder 1222, the horizontal up-scaler 1223, the super resolution unit 124, the display unit 125, and the transmitter 126 by elements such as LSIs.

The decoder 1222 generates the field picture by decoding the encoded image data received by the receiver 121. Then, the decoder 1222 extracts a cut-off frequency 1228 and a conversion rate 1229 from the SEI on the stream syntax included in the received encoded image data. Here, the conversion rate 1229 is n/m.

Figure 12:
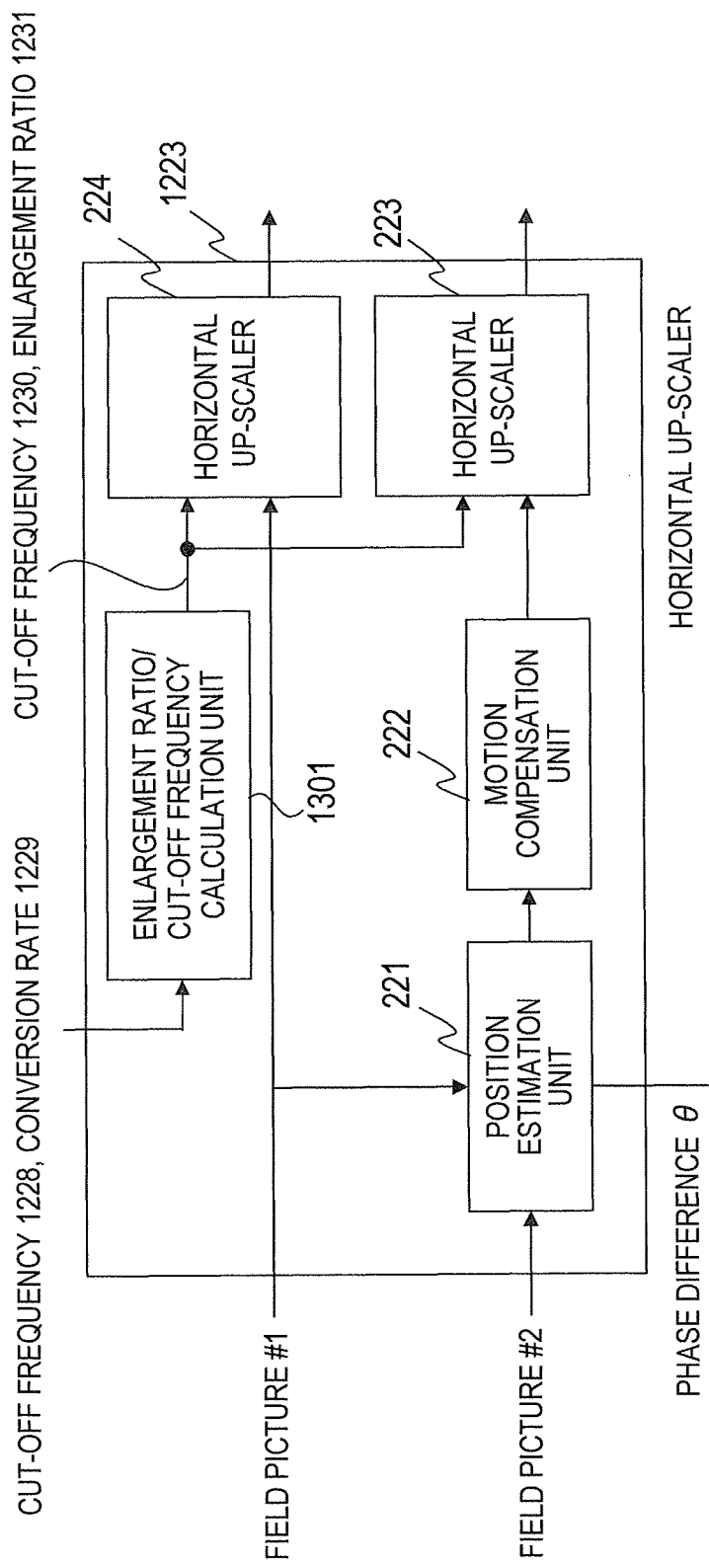
FIG. 12 is a block diagram illustrating a configuration of a horizontal up-scaler according to the second embodiment of this invention.

FIG. 12 is a block diagram illustrating a configuration of the horizontal up-scaler 1223 according to the second embodiment of this invention.

The horizontal up-scaler 1223 illustrated in FIG. 12 is configured on the assumption that the super resolution unit 124 increases the resolution of the image by using the sampling phase difference θ that occurs when the subject moves among a plurality of images. The horizontal up-scaler 1223 includes the position estimation unit 221, the motion compensation unit 222, the horizontal up-scaler 223, the horizontal up-scaler 224, and an enlargement ratio/cut-off frequency calculation unit 1301.

The horizontal up-scaler 1223 illustrated in FIG. 12 uses the two images (field picture #1 and field picture #2) to motion-compensate one (field picture #2) of the images, and further outputs the two images (field picture #1, and field picture #2 obtained after the motion compensation).

The enlargement ratio/cut-off frequency calculation unit 1301 receives the cut-off frequency 1228 and the conversion rate 1229 that have been extracted by the receiver 121. Then, based on the cut-off frequency 1228 and the conversion rate 1229 that have been received, the enlargement ratio/cut-off frequency calculation unit 1301 calculates a cut-off frequency 1230 and an enlargement ratio 1231 that are used in the horizontal up-scaler 223 and the horizontal up-scaler 224.

The horizontal up-scaler 223 and the horizontal up-scaler 224 increase the pixels in the horizontal direction of the images (field picture #2 and field picture #1) based on the cut-off frequency 1230 and the enlargement ratio 1231 that have been transmitted from the enlargement ratio/cut-off frequency calculation unit 1301.

The enlargement ratio/cut-off frequency calculation unit 1301 may set, for example, the reciprocal of the conversion rate 1229 as an enlargement ratio. Specifically, in the case where the conversion rate 1229 is n/m, the enlargement ratio 1231 may be set to m/n. Further, the cut-off frequency 1230 may be set to be the same as the cut-off frequency 1228 transmitted from the decoder 1222.

The frequency spectrums illustrated in FIGS. 7A to 7D are the same as the frequency spectrums output by the horizontal up-scaler 223 and the horizontal up-scaler 224 according to the second embodiment which are obtained in the case where the enlargement ratio 1231 is m/n on the conditions of m=3 and n=2. As a result of the horizontal up-scaler 1223, the frequency spectrum illustrated in FIG. 7D is output.

Then, new aliasing components other than the aliasing components that have occurred in the downsampling unit 205 do not occur in the frequency spectrum illustrated in FIG. 7D. Specifically, new aliasing components that occur due to the overlaps between the aliasing components 741 accompanying the interlacing and the aliasing components 740 along the horizontal direction do not occur in the frequency spectrum illustrated in FIG. 7D.

In other words, the horizontal up-scaler 1223 according to the second embodiment can prevent the occurrence of new aliasing components by using the cut-off frequency 1228 and the conversion rate 1229 that are transmitted from the image transmission device 1200.

Further, in the case where the super resolution unit 124 increases the resolution by using only one image, the horizontal up-scaler 1223 does not need to include the position estimation unit 221, the motion compensation unit 222, or the horizontal up-scaler 224.

Figure 13:
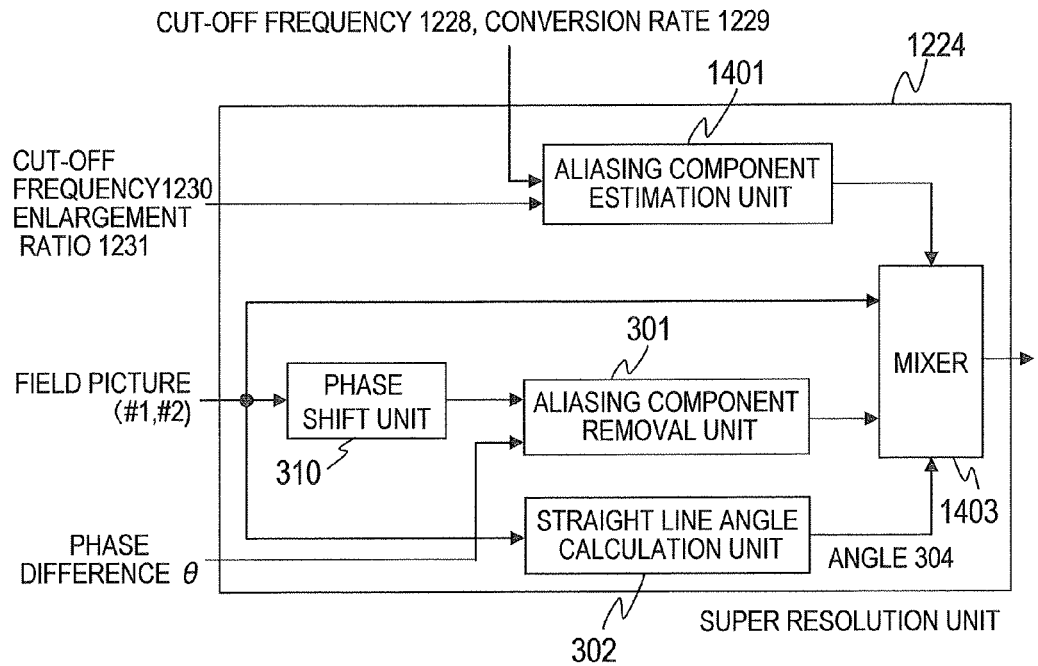
FIG. 13 is a block diagram illustrating a configuration of a super resolution unit according to the second embodiment of this invention.

FIG. 13 is a block diagram illustrating a configuration of a super resolution unit 1224 according to the second embodiment of this invention.

The super resolution unit 1224 according to the second embodiment estimates the occurrence of the aliasing components in a spatial direction by using the cut-off frequency 1228 (hereinafter, referred to as "first cut-off frequency 1228") and the conversion rate 1229 that are transmitted from the decoder 1222 illustrated in FIG. 13 and the cut-off frequency 1230 (hereinafter, referred to as "second cut-off frequency 1230") and the enlargement ratio 1231 that are transmitted from the horizontal up-scaler 1223, and uses the estimated results to thereby increase the resolution of the field picture.

It should be noted that in the same manner as in the case of the super resolution unit 124 according to the first embodiment, the field picture transmitted to the super resolution unit 1224 according to the second embodiment may include the brightness component and the two color-difference components, and may include a red component, a green component, and a blue component. Further, the super resolution unit 1224 according to the second embodiment may have a function of determining whether or not to execute the super resolution processing for each of the above-mentioned components and retain parameters used for the determination.

The super resolution unit 1224 illustrated in FIG. 13 includes the aliasing component removal unit 301, the straight line angle calculation unit 302, the phase shift unit 310, a mixer 1403, and an aliasing component estimation unit 1401. The aliasing component removal unit 301, the straight line angle calculation unit 302, and the phase shift unit 310 of the super resolution unit 1224 according to the second embodiment which are described below are the same as the aliasing component removal unit 301, the straight line angle calculation unit 302, and the phase shift unit 310 of the super resolution unit 124 according to the first configuration example of the first embodiment.

The aliasing component estimation unit 1401 estimates the occurrence of the aliasing components in a spatial direction by using the first cut-off frequency 1228 and the conversion rate 1229 that are transmitted from the decoder 1222 and the second cut-off frequency 1230 and the enlargement ratio 1231 that are used by the horizontal up-scaler 1223.

An estimation method for the aliasing components performed by the aliasing component estimation unit 1401 is described below.

In the estimation method described below, the conversion rate 1299 is n/m, the enlargement ratio 1231 is m/n, and the sampling frequency obtained after the pixels along the horizontal direction are scaled up is µs. Therefore, a first condition for causing the aliasing component when the pixels along the horizontal direction are scaled down is a case where the first cut-off frequency 1228 is larger than $(n/2\,m) \times \mu s$. Further, a second condition for avoiding the occurrence of new aliasing components when the pixels along the horizontal direction are scaled up is a case where a second cut-off frequency is smaller than $(1/2) \times \mu s$.

Therefore, based on the above-mentioned first condition and second condition, the aliasing component estimation unit 1401 determines that aliasing is likely to occur in the horizontal frequency components from $(n/2\,m) \times \mu s - ((\text{first cut-off frequency}) - (n/2\,m) \times \mu s)$ to $(1/2) \times \mu s$. Therefore, information indicating that the aliasing components occur in the pixels of the horizontal frequencies from $(n/2\,m) \times \mu s - ((\text{first cut-off frequency}) - (n/2\,m) \times \mu s)$ to $(1/2) \times \mu s$ is stored in aliasing component occurrence data.

Further, the aliasing component estimation unit 1401 determines that aliasing does not occur in the horizontal frequency components smaller than $(n/2\,m) \times \mu s - ((\text{first cut-off frequency}) - (n/2\,m) \times \mu s)$. Therefore, information indicating that the aliasing components do not occur in the pixels of the horizontal frequencies smaller than $(n/2\,m) \times \mu s - ((\text{first cut-off frequency}) - (\pi/2\,m) \times \mu s)$ is stored in the aliasing component occurrence data.

Then, the aliasing component estimation unit 1401 transmits the aliasing component occurrence data in which the information is stored to the mixer 1403. The aliasing component estimation unit 1401 may indicate the aliasing component occurrence data by, for example, a relational expression between the horizontal frequency μ and the vertical frequency v.

It should be noted that the description of this embodiment is directed to the configuration for the case of using the plurality of field pictures, but the configuration may use one image. In that case, there is no need to provide the phase shift unit 310, or the phase difference does not need to be input to the aliasing component removal unit 301.

Figure 14:
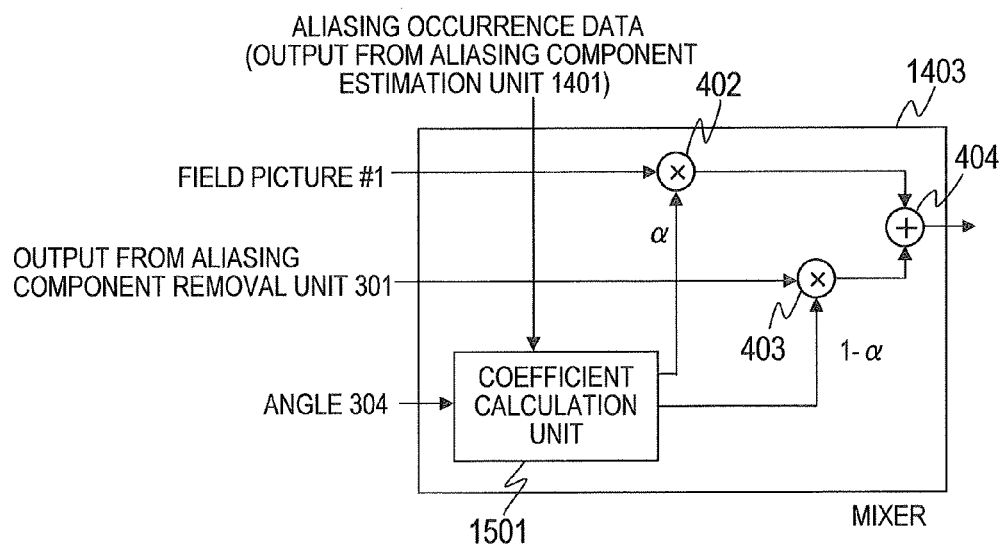
FIG. 14 is a block diagram illustrating a configuration of a mixer according to the second embodiment of this invention.

FIG. 14 is a block diagram illustrating a configuration of the mixer 1403 according to the second embodiment of this invention.

The mixer 1403 includes a coefficient calculation unit 1501, the multiplier 402, the multiplier 403, and the adder 404. The multiplier 402, the multiplier 403, and the adder 404 of the mixer 1403 are the same as the multiplier 402, the multiplier 403, and the adder 404 of the mixer 303 according to the first embodiment.

The mixer 1403 and the mixer 303 according to the first embodiment are different from each other in that the coefficient calculation unit 1501 determines the coefficient α by using the aliasing component occurrence data transmitted from the aliasing component estimation unit 1401 and the angle 304 transmitted from the straight line angle calculation unit 302.

The coefficient calculation unit 1501 extracts, for example, the item indicated by the angle 304 from among items (1), (2), and (3) illustrated in FIG. 5C. Then, with reference to the aliasing component occurrence data, if the aliasing component occurs in the extracted item, the coefficient calculation unit 1501 sets the coefficient α to 0. Further, if the aliasing component does not occur in the extracted item, the coefficient calculation unit 1501 sets the coefficient α to 1.

According to the super resolution unit 1224 according to the second embodiment, by estimating the pixels in which the aliasing components occur, it is possible to change the amount of the aliasing components to be removed based on the presence/absence of the occurrence of the aliasing components and the angle 304.

Further, the aliasing component estimation unit 1401 according to the second embodiment may be added to the second configuration example of the super resolution unit 124 according to the first embodiment. In this case, the coefficient determination unit 910 determines the value of the coefficient α based on the aliasing component occurrence data and the angle 304 to thereby calculate the coefficients (C0, C2, C1, and C3) and change the amount of the aliasing components to be removed.

In the image transfer system according to the second embodiment as described above, the image transmission device 1200 scales down the interlaced field picture in the horizontal direction and compresses the scaled-down image. Then, the cut-off frequency and the conversion rate used for scaling down the resolution in the horizontal direction are multiplexed and encoded, and are transmitted to the image reception device 1220 via the transmission line 110.

Here, the image transmission device 1200 according to the second embodiment can compress the scaled-down image, and can therefore reduce a transmission data amount. This allows the video signal having a larger amount of information to be transmitted even if a limitation is placed on the communication band of the transmission line 110.

Further, the image reception device 1220 according to the second embodiment receives the encoded image data obtained by the compression and encoding, and decodes the received encoded image data into the field picture. Then, the image reception device 1220 acquires the field picture along with the conversion rate and the cut-off frequency that are set when the resolution in the horizontal direction is scaled down, and scales up the decoded field picture in the horizontal direction based on the conversion rate and the cut-off frequency that have been transmitted from the image transmission device 1200. This can prevent new aliasing components from occurring in addition to the aliasing components that have already occurred. Therefore, the super resolution unit 124 according to the second embodiment can appropriately remove the aliasing components.

Further, the angle 304 of the straight line or the edge is obtained in the respective pixels of the scaled-up field picture, and the amount of the aliasing components to be removed is changed depending on the angle 304. In particular, the amount of the aliasing components to be removed is increased for the straight line or the edge inclined in the vertical direction, and the amount of the aliasing components to be removed is reduced for the straight line or the edge inclined in the horizontal direction.

Accordingly, most of the aliasing components along the horizontal direction can be removed, while most of the aliasing components accompanying the interlacing are left even if there is a motion in the subject along the vertical direction. Further, the resolution is scaled up in the horizontal direction based on the conversion rate 1229 and the first cut-off frequency 1228 that are used when the resolution in the horizontal direction are scaled down, thereby determining the above-mentioned components whose aliasing components are to be removed and the amount to be removed with more accuracy, and it is possible to generate a high-resolution field picture exhibiting little image degradation.

Further, the super resolution unit 1224 of the image reception device 1220 according to the second embodiment uses the conversion rate 1229, the first cut-off frequency 1228, and the enlargement ratio 1231 and the second cut-off frequency 1230 that are used to scale up the resolution in the horizontal direction to estimate the occurrence of the aliasing components in a spatial direction, and uses the above-mentioned factors along with the angle 304 of the straight line or the edge in the removal of the aliasing component to thereby enable the extent to which the aliasing components are removed to be adjusted with more accuracy, and hence it is possible to generate a high-resolution field picture exhibiting little image degradation.

In addition, by transmitting the cut-off frequency and the conversion rate from the image transmission device 1200, the image transfer system according to the second embodiment can automatically change the cut-off frequency and the enlargement ratio used by the image reception device 1220.

For example, in a case where the image transmission device 1200 is placed in a place that allows the administrator to perform inputs/outputs and the image reception device 1220 is placed in a place that does not allow the administrator to perform inputs/outputs, the image transfer system according to the second embodiment can immediately reflect the change of the cut-off frequency and the enlargement ratio in the image transmission device 1200 onto the image reception device 1220.

It should be noted that the image transfer system according to the second embodiment can be implemented as an image storage device by using a storage device in the transmission line 110 and integrating the image transmission device 1200 and the image reception device 1220.

Third Embodiment

The image transfer system according to the first embodiment transmits/receives interlaced scanned image (field pictures), while an image transfer system according to a third embodiment of this invention transmits/receives an image (frame picture) of progressive scanning. Also for the image of the progressive scanning, a high-resolution image exhibiting little image degradation such as noise can be generated by the method according to this embodiment.

The same functions of the image transfer system described below as those of the image transfer system according to the first embodiment and those of the image transfer system according to the second embodiment are denoted by the same reference numerals, and the duplicate description is omitted.

Figure 15:
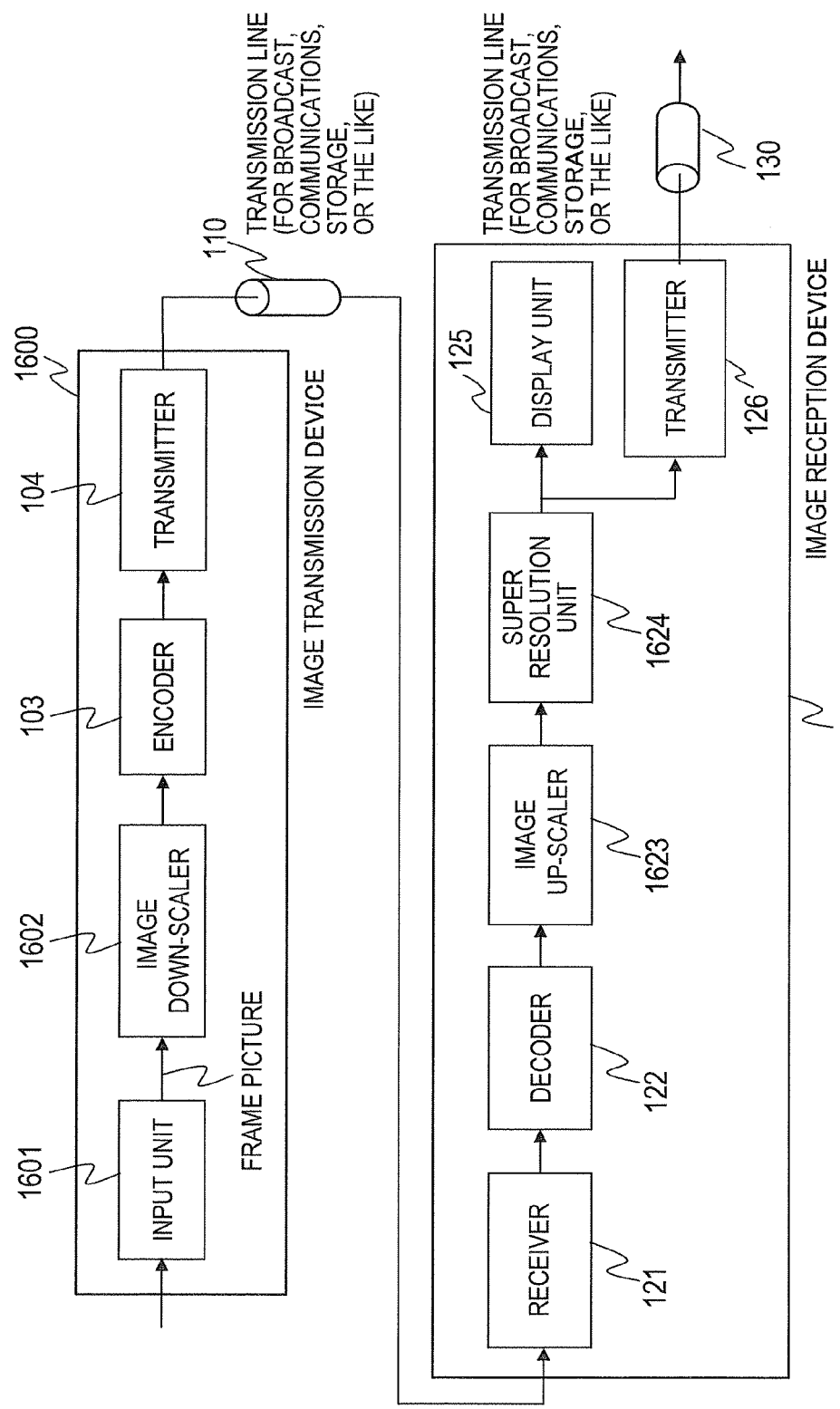
FIG. 15 is a block diagram illustrating an image transfer system according to a third embodiment of this invention.

FIG. 15 is a block diagram illustrating an image transfer system according to the third embodiment of this invention.

The image transmission device 1600 includes an input unit 1601, an image down-scaler 1602, the encoder 103, and the transmitter 104. The encoder 103 and the transmitter 104 of the image transmission device 1600 are the same as the encoder 103 and the transmitter 104 of the image transmission device 100 according to the first embodiment, respectively.

In the same manner as in the case of the image transmission device 100 according to the first embodiment, the image transmission device 1600 may be a computer including a processor and a memory, and may implement functions such as the input unit 1601, the image down-scaler 1602, the encoder 103, and the transmitter 104 by programs. Alternatively, the image transmission device 1600 may implement the functions such as the input unit 1601, the image down-scaler 1602, the encoder 103, and the transmitter 104 by elements such as LSIs.

Further, the image transmission device 1600 may include an input device that allows an administrator or the like to input a parameter to be used in the image transmission device 1600.

An image reception device 1620 includes the receiver 121, the decoder 122, an image up-scaler 1623, a super resolution unit 1624, the display unit 125, and the transmitter 126. The receiver 121, the decoder 122, the display unit 125, and the transmitter 126 of the image reception device 1620 are the same as the receiver 121, the decoder 122, the display unit 125, and the transmitter 126 of the image reception device 120 according to the first embodiment.

In the same manner as in the case of the image reception device 120 according to the first embodiment, the image reception device 1620 may be a computer including a processor and a memory, and may implement functions such as the receiver 121, the decoder 122, the image up-scaler 1623, the super resolution unit 1624, the display unit 125, and the transmitter 126 by programs. Alternatively, the image reception device 1620 may implement the functions such as the receiver 121, the decoder 122, the image up-scaler 1623, the super resolution unit 1624, the display unit 125, and the transmitter 126 by elements such as LSIs.

Further, the image reception device 1620 may include an input device that allows the administrator or the like to input a parameter to be used in the image reception device 1620.

The input unit 1601 receives an input of, for example, a frame picture for displaying a moving image such as a television broadcast signal by the progressive scanning. Further, if an encoded stream is input to the input unit 1601, the input unit 1601 decodes the input encoded stream, and then extracts the frame picture of the moving image from the decoding result.

Figure 16:
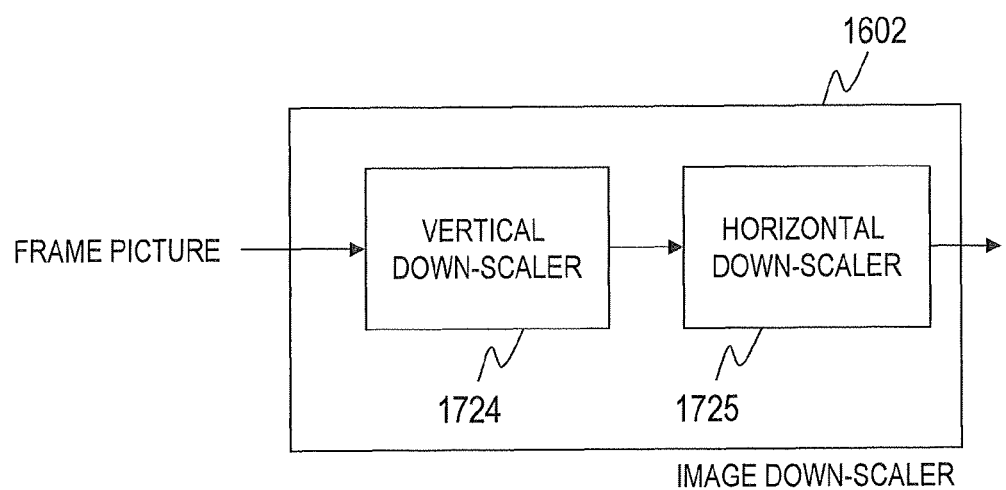
FIG. 16 is a block diagram illustrating a configuration of an image down-scaler according to the third embodiment of this invention.

FIG. 16 is a block diagram illustrating a configuration of the image down-scaler 1602 according to the third embodiment of this invention.

The image down-scaler 1602 according to the third embodiment includes a vertical down-scaler 1724 and a horizontal down-scaler 1725. The horizontal down-scaler 1725 is the same as the horizontal down-scaler 102 illustrated in FIG. 2A or 2B, and the vertical down-scaler 1724 is the same as the horizontal down-scaler 102 illustrated in FIG. 2A or 2B. The vertical down-scaler 1724 is different from the horizontal down-scaler 102 in that the frequency spectrum along the vertical direction is scaled down (the number of pixels along the vertical direction is reduced).

The vertical down-scaler 1724 reduces the pixels along the vertical direction of the frame picture by using the conversion rate mv/nv, and the horizontal down-scaler 1725 reduces the pixels along the horizontal direction of the frame picture by using the conversion rate mh/nh.

Figure 17A:
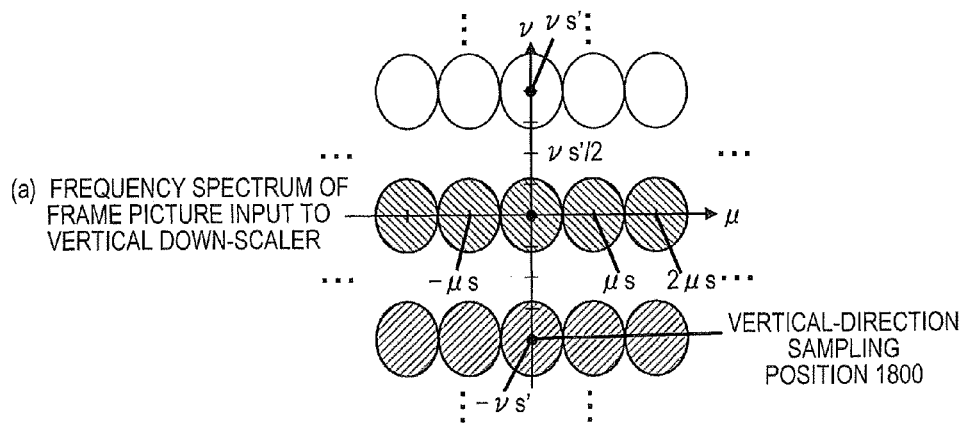
FIG. 17A is an explanatory diagram illustrating a frequency spectrum of an image input to a vertical down-scaler according to the third embodiment of this invention.
Figure 17B:
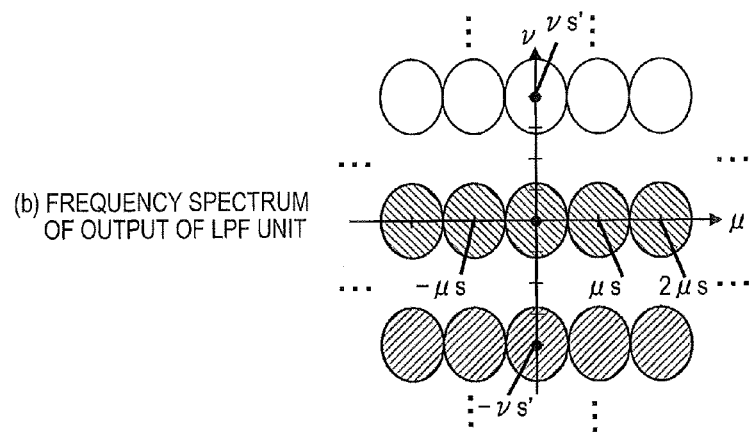
FIG. 17B is an explanatory diagram illustrating a frequency spectrum of output from an interpolation low-pass filter unit of the vertical down-scaler according to the third embodiment of this invention.
Figure 17C:
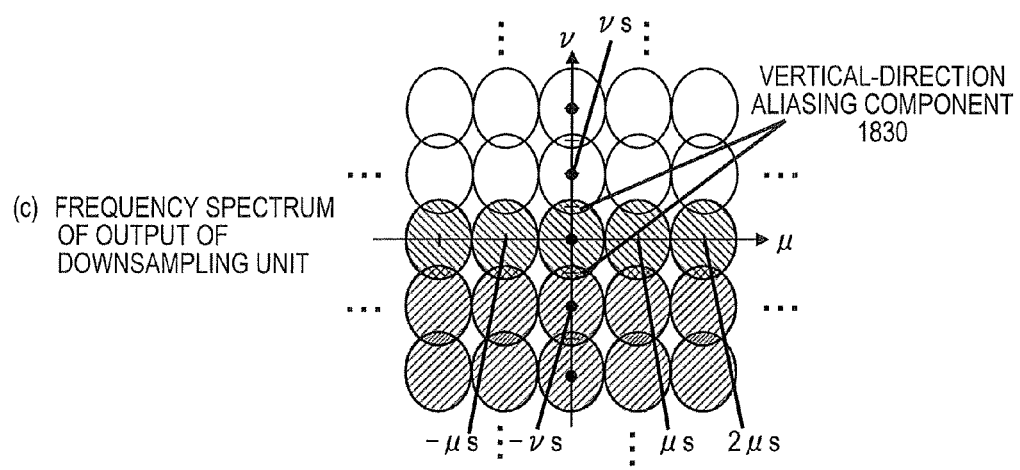
FIG. 17C is an explanatory diagram illustrating a frequency spectrum of output from a downsampling unit of the vertical down-scaler according to the third embodiment of this invention.

FIGS. 17A to 17C illustrate frequency spectrums obtained when the vertical down-scaler 1724 reduces the number of pixels along the vertical direction on the conditions of mv=1 and nv=2. In FIGS. 17A to 17C, the vertical down-scaler 1724 is of the oversampling type illustrated in FIG. 2B, and includes the upsampling unit 203, the interpolation low-pass filter unit 204, and the downsampling unit 205.

In diagrams illustrated in FIGS. 17A to 17D, the horizontal axis represents the horizontal frequency $\mu$, the vertical axis represents the vertical frequency $v$, and the black circles represent vertical-direction sampling positions (frequencies) 1800. Further, the sampling frequency in the horizontal direction is a frequency of every $\mu s$, and the sampling frequency in the vertical direction is a frequency of every $vs'$.

FIG. 17A is an explanatory diagram illustrating the frequency spectrum of the image input to the vertical down-scaler 1724 according to the third embodiment of this invention.

The frequency spectrum illustrated in FIG. 17A indicates the frequency spectrum of the frame picture input to the vertical down-scaler 1724. It is assumed that the vertical frequency components of the frame picture do not include frequency components equal to or higher than the Nyquist frequency ($vs'/2$). Further, it is assumed that the horizontal frequency components of the frame picture do not include the frequency components equal to or higher than the Nyquist frequency ($\mu s/2$).

In order to scale down the frame picture output from the input unit 101 by 1/2 times in the vertical direction, the vertical down-scaler 1724 causes the interpolation low-pass filter unit 204 to perform filtering, and causes the downsampling unit 205 to perform 1/2-times downsampling.

FIG. 17B is an explanatory diagram illustrating the frequency spectrum of the output from the interpolation low-pass filter unit 204 of the vertical down-scaler 1724 according to the third embodiment of this invention.

The frequency spectrum illustrated in FIG. 17B indicates the output from the interpolation low-pass filter unit 204 of the vertical down-scaler 1724. The interpolation low-pass filter unit 204 leaves frequencies in the vicinities of $v=0$ and a frequency (sampling frequency in the vertical direction 1800) spaced apart from $v=0$ by the integral multiple of $vs'$ within the frequency spectrum along the horizontal direction illustrated in FIG. 17A, and deletes the other frequency components.

The cut-off frequency used in FIG. 17B is $vs'/2$. The cut-off frequency for the interpolation low-pass filter unit 204 of the vertical down-scaler 1724 is set in advance by the administrator or the like to such a value as to cause aliasing components 1830 along the vertical direction in the frequency spectrum of the output from the downsampling unit 205 which is illustrated in FIG. 17C.

FIG. 17C is an explanatory diagram illustrating the frequency spectrum of the output from the downsampling unit 205 of the vertical down-scaler 1724 according to the third embodiment of this invention.

The frequency spectrum illustrated in FIG. 17C indicates the output from the downsampling unit 205 of the vertical down-scaler 1724 on the condition of nv=2. As illustrated in FIG. 17C, the sampling frequency in the vertical direction is set by the downsampling unit 205 to a frequency of every vs'(=vs'/2). The frequency components of the output from the interpolation low-pass filter unit 204 are arrayed at the intervals of the sampling frequency. As a result, the frame picture is scaled down in the vertical direction.

As illustrated in FIG. 17C, the interpolation low-pass filter unit 204 of the vertical down-scaler 1724 sets the cut-off frequency to vs/2 or more to thereby cause the aliasing components 1830 along the vertical direction.

The horizontal down-scaler 1725 previously retains such a cut-off frequency as to cause the aliasing components along the horizontal direction without an overlap between the aliasing components 1830 that have occurred due to the processing performed by the vertical down-scaler 1724.

The horizontal down-scaler 1725 according to the third embodiment scales down the output of the frequency spectrum illustrated in FIG. 17C in the horizontal direction on the conditions of mh=2 and nh=3. Specifically, the horizontal down-scaler 1725 performs the same processing as the horizontal down-scaler 102 according to the first embodiment, and the frequency spectrums of the outputs are the same as the frequency spectrums illustrated in FIGS. 6A to 6D. Further, the frequency spectrum of the image output by the image down-scaler 1602 is the same as the frequency spectrum of FIG. 6D.

The image down-scaler 1602 performs the processing to convert the frame picture into the image scaled down in the horizontal and vertical directions.

Figure 18:
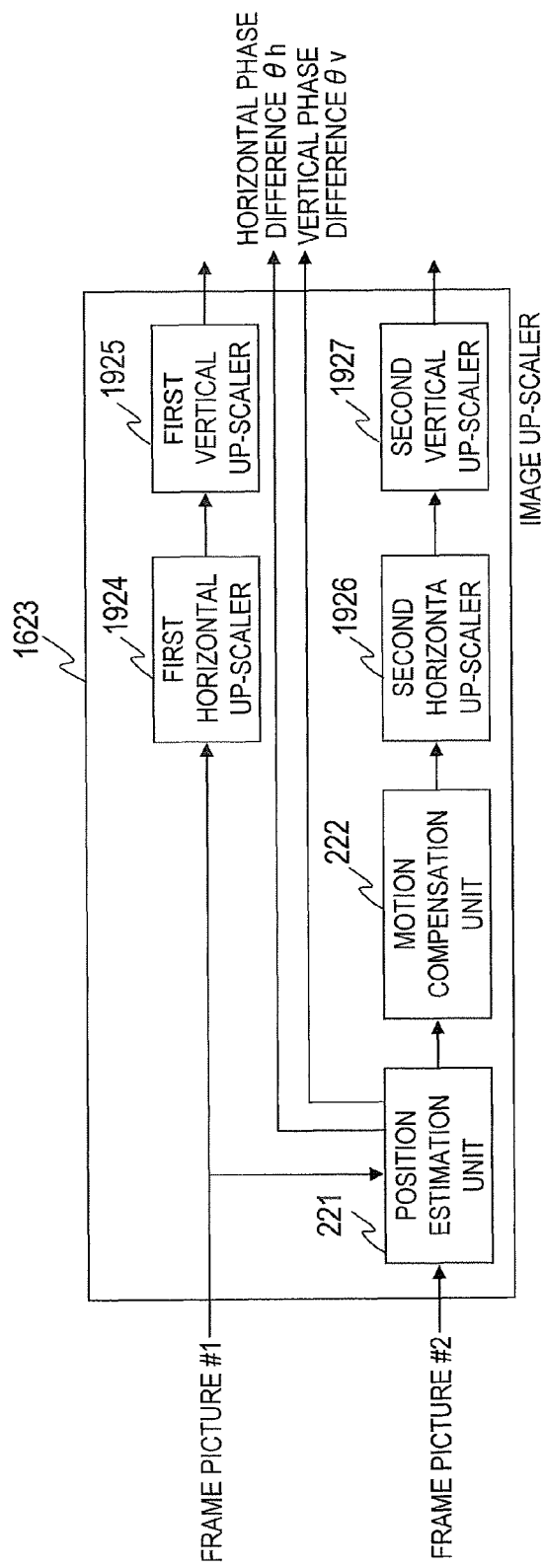
FIG. 18 is a block diagram illustrating a configuration of an image up-scaler according to the third embodiment of this invention.

FIG. 18 is a block diagram illustrating a configuration of the image up-scaler 1623 according to the third embodiment of this invention.

The image up-scaler 1623 illustrated in FIG. 18 has a function for increasing the resolution of the frame picture by using the phase difference that occurs in the super resolution unit 1624 when the subject moves among a plurality of frame pictures. The image up-scaler 1623 includes the position estimation unit 221, the motion compensation unit 222, a first horizontal up-scaler 1924, a first vertical up-scaler 1925, a second horizontal up-scaler 1926, and a second vertical up-scaler 1927.

The first horizontal up-scaler 1924, the first vertical up-scaler 1925, the second horizontal up-scaler 1926, and the second vertical up-scaler 1927 each have the same configuration as the horizontal down-scaler 102 illustrated in FIG. 2A or 2B.

The position estimation unit 221 compares the respective pixels of the frame picture #1 with the respective pixels of the frame picture #2 to thereby obtain a sampling phase difference θh in the horizontal direction and a sampling phase difference θv in the vertical direction for each of the pixels.

Figure 19A:
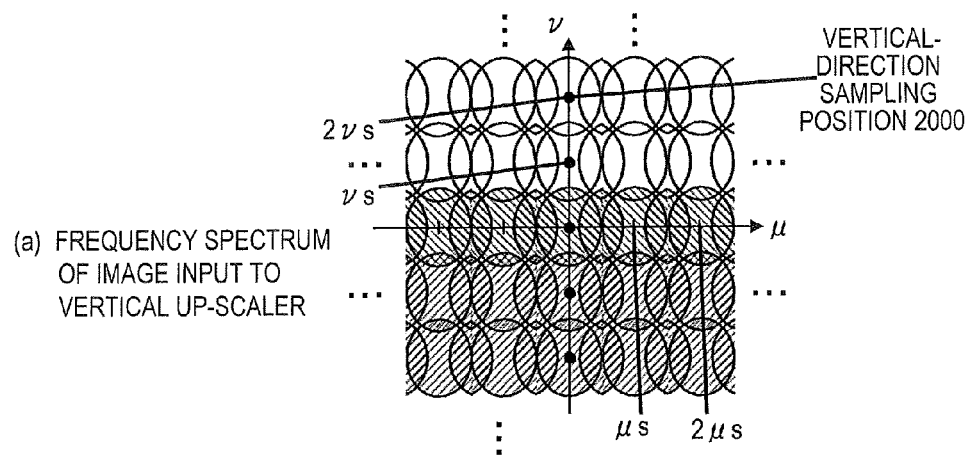
FIG. 19A is an explanatory diagram illustrating a frequency spectrum of a frame picture input to a first vertical up-scaler or a second vertical up-scaler according to the third embodiment of this invention.
Figure 19B:
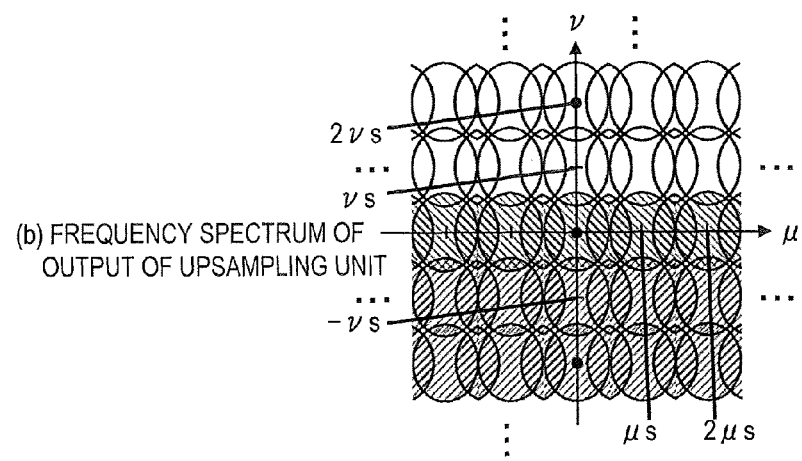
FIG. 19B is an explanatory diagram illustrating a frequency spectrum of output from an upsampling unit of the first vertical up-scaler or the second vertical up-scaler according to the third embodiment of this invention.
Figure 19C:
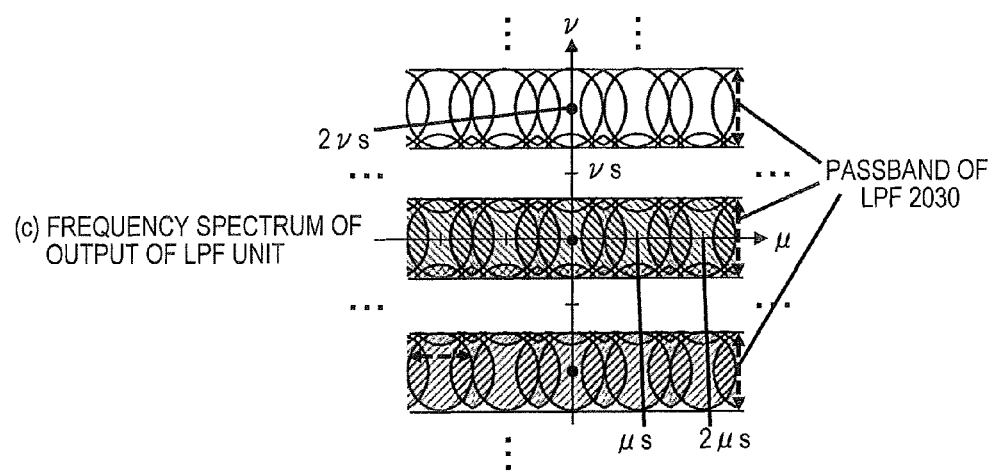
FIG. 19C is an explanatory diagram illustrating a frequency spectrum of output from an interpolation low-pass filter unit of the first vertical up-scaler or the first vertical up-scaler according to the third embodiment of this invention.

FIGS. 19A to 19C illustrate frequency spectrums of the outputs from the respective processing units, which are exhibited in such a processing that the first vertical up-scaler 1925 or the second vertical up-scaler 1927 reduces the number of pixels in the vertical direction of the frame picture on the conditions of mv=1 and nv=2. In FIGS. 19A to 19C, the first vertical up-scaler 1925 and the second vertical up-scaler 1927 are of the oversampling type illustrated in FIG. 2B, and each include the upsampling unit 203, the interpolation low-pass filter unit 204, and the downsampling unit 205.

In diagrams illustrated in FIGS. 19A to 19C, the horizontal axis represents the horizontal frequency μ, the vertical axis represents the vertical frequency v, and the black circles represent vertical-direction sampling positions (frequencies) 2000. Further, the sampling frequency in the horizontal direction is a frequency of every μs, and the sampling frequency in the vertical direction is a frequency of every vs' (=2 vs).

FIG. 19A is an explanatory diagram illustrating the frequency spectrum of the frame picture input to the first vertical up-scaler 1925 or the second vertical up-scaler 1927 according to the third embodiment of this invention.

The frequency spectrum illustrated in FIG. 19A is a frequency spectrum of the frame picture input from the first horizontal up-scaler 1924 to the first vertical up-scaler 1925 or input from the second horizontal up-scaler 1926 to the second vertical up-scaler 1927.

In other words, the frequency spectrum illustrated in FIG. 19A is a frequency spectrum of the frame picture output as a result of the same processing performed by the first horizontal up-scaler 1924 or the second horizontal up-scaler 1926 as the processing performed by the horizontal up-scaler 123 according to the first embodiment. Therefore, FIG. 19A corresponds to FIG. 7D.

In order to scale up the frame picture input from the first horizontal up-scaler 1924 in the vertical direction by two times, the first vertical up-scaler 1925 causes the upsampling unit 203 to perform 2-times upsampling and causes the interpolation low-pass filter unit 204 to perform the filtering. Further, in order to scale up the frame picture input from the second horizontal up-scaler 1926 in the vertical direction by two times, the second vertical up-scaler 1927 causes the upsampling unit 203 to perform 2-times upsampling and causes the interpolation low-pass filter unit 204 to perform filtering.

FIG. 19B is an explanatory diagram illustrating the frequency spectrum of the output from the upsampling unit 203 of the first vertical up-scaler 1925 or the second vertical up-scaler 1927 according to the third embodiment of this invention.

The frequency spectrum illustrated in FIG. 19B indicates the output from the upsampling unit 203 of the first vertical up-scaler 1925 or the second vertical up-scaler 1927 on the condition of mv=2. As illustrated in FIGS. 19A and 19B, the intervals of the sampling frequency in the vertical direction widen from vs in FIG. 19A to 2 vs in FIG. 19B.

FIG. 19C is an explanatory diagram illustrating the frequency spectrum of the output from the interpolation low-pass filter unit 204 of the first vertical up-scaler 1925 or the first vertical up-scaler 1927 according to the third embodiment of this invention.

The frequency spectrum illustrated in FIG. 19C indicates the output from the interpolation low-pass filter unit 204 of the first vertical up-scaler 1925 or the second vertical up-scaler 1927. The interpolation low-pass filter unit 204 of the first vertical up-scaler 1925 or the second vertical up-scaler 1927 leaves only the frequency band (passband 2030) in the vicinities of the sampling frequencies in the vertical direction (in FIG. 19C, v=0, v=2 vs, and the like) within the frequency spectrum illustrated in FIG. 19B, and deletes the other frequency components.

The administrator or the like sets in advance the cut-off frequency for the interpolation low-pass filter unit 204 to a value that does not cause new aliasing components in the vertical direction within the frequency spectrum of the output from the downsampling unit 205. The cut-off frequency used in FIG. 19B is set between vs/2 and vs.

Figure 20:
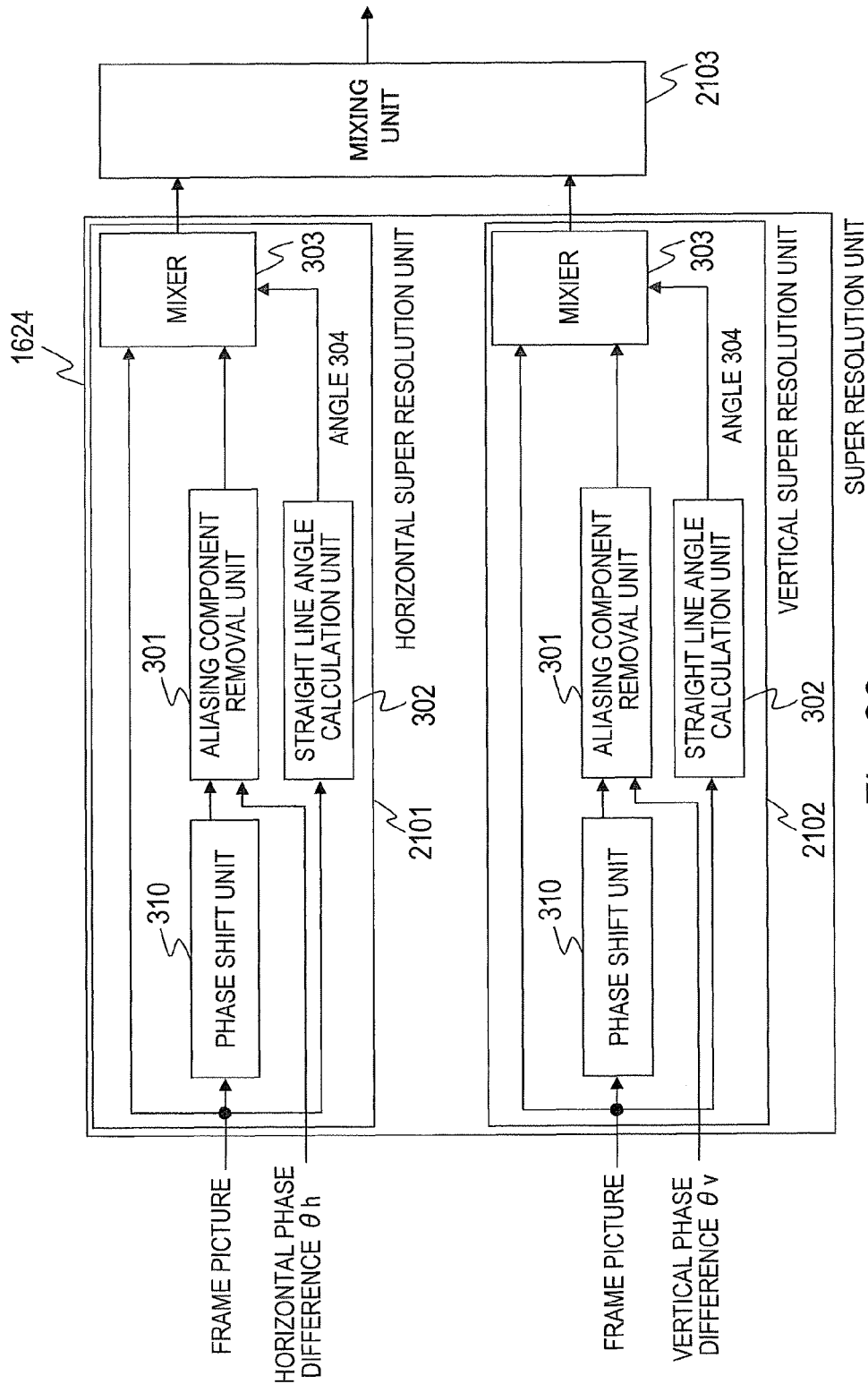
FIG. 20 is a block diagram illustrating a configuration of a super resolution unit according to the third embodiment of this invention.

FIG. 20 is a block diagram illustrating a configuration of the super resolution unit 1624 according to the third embodiment of this invention.

It should be noted that the field picture transmitted to the super resolution unit 1624 according to the third embodiment may include the brightness component and the two color-difference components, and may include a red component, a green component, and a blue component. Further, in the same manner as in the case of the super resolution unit 124 according to the first embodiment, the super resolution unit 1624 according to the third embodiment may have a function of determining whether or not to execute the super resolution processing for each of the above-mentioned components and retain parameters used for the determination.

The super resolution unit 1624 includes a horizontal super resolution unit 2101, a vertical super resolution unit 2102, and a mixer 2103.

The horizontal super resolution unit 2101 uses the sampling phase difference θh in the horizontal direction to increase the resolution of the frame picture in the horizontal direction. The vertical super resolution unit 2102 uses the sampling phase difference θv in the vertical direction to increase the resolution in the vertical direction. The horizontal super resolution unit 2101 using the sampling phase difference θh and the vertical super resolution unit 2102 using the sampling phase difference θv may employ, for example, a horizontal super resolution unit and a vertical super resolution unit disclosed in JP 2009-017242 A.

The mixer 2103 mixes the frame pictures output from the horizontal super resolution unit 2101 and the vertical super resolution unit 2102.

According to the third embodiment, the image whose resolution increases in the horizontal direction and the image whose resolution increases in the vertical direction are mixed to thereby enable the resolution of the image obtained by the progressive scanning to increase in both the horizontal direction and the vertical direction.

The horizontal super resolution unit 2101 and the vertical super resolution unit 2102 each have the same configuration as the super resolution unit 124 illustrated in FIG. 3. At this time, the mixer 303 of the horizontal super resolution unit 2101 sets the coefficient α to 1 if the value of the angle 304 is small, and sets the coefficient α to 0 if the value of the angle 304 is large. In this manner, it is possible to appropriately remove the aliasing components along the horizontal direction.

Further, the mixer 303 of the vertical super resolution unit 2102 sets the coefficient α to 0 if the value of the angle 304 is small, and sets the coefficient α to 1 if the value of the angle 304 is large. In this manner, it is possible to appropriately remove the aliasing components along the vertical direction when there is a motion in the subject along the vertical direction.

Further, the super resolution unit 1624 may employ the super resolution unit 124 according to the first embodiment. In this case, the super resolution unit 1624 can realize the increased resolution by using a small-scale circuit although the effect of increasing the resolution is smaller than in the configuration illustrated in FIG. 20.

As described above, in the image transfer system according to the third embodiment, the image transmission device 1600 scales down the image obtained by the progressive scanning, and compresses and encodes the scaled-down image to thereby generate the encoded image data. Then, the generated encoded image data is transmitted to the image reception device 1620 via the transmission line 110.

The image transmission device 1600 can reduce the amount of the encoded image data to be transmitted to the image reception device 1620 because the image is scaled down and then compressed. Therefore, it is possible to transmit the video signal having a larger amount of information even if a limitation is placed on the communication band of the transmission line 110.

Further, the image reception device 1620 receives and decodes the encoded image data obtained by the compression and encoding, and scales up the acquired frame picture. Then, the image reception device 1620 obtains the angle 304 of the straight line or the edge in the respective pixels of the scaled-up frame picture, and based on the angle 304, adjusts the extent to which the aliasing components are removed. In addition, by preventing new aliasing components from occurring when the frame picture is scaled up, it is possible to generate a high-resolution field picture exhibiting little image degradation.

It should be noted that in the third embodiment, in the same manner as in the image transfer system according to the second embodiment, the conversion rate (1/n) and the cut-off frequency that are used for scaling down the frame picture may be transmitted to the image reception device 1620, and the first horizontal up-scaler 1924, the first vertical up-scaler 1925, the second horizontal up-scaler 1926, and the second vertical up-scaler 1927 of the image reception device 1220 may scale up the frame picture based on the conversion rate (1/n) and the cut-off frequency that have been transmitted.

Further, the image transfer system may be configured as an image storage device by using a storage device in the transmission line 110 and implementing the image transmission device 1600 and the image reception device 1620 as one device.

Fourth Embodiment

An image pickup device 2200 according to a fourth embodiment of this invention is an image pickup device in which the function for generating a high-resolution image which is provided to the image transfer system according to the first embodiment, the second embodiment, or the third embodiment is implemented. This enables the image pickup device 2200 to pick up a high-resolution image.

In the following description, the processing units serving as the same functions as those of the image transfer system according to the first embodiment, the image transfer system according to the second embodiment, and the image transfer system according to the third embodiment that are described above are denoted by the same reference numerals, and the duplicate description is omitted.

Figure 21:
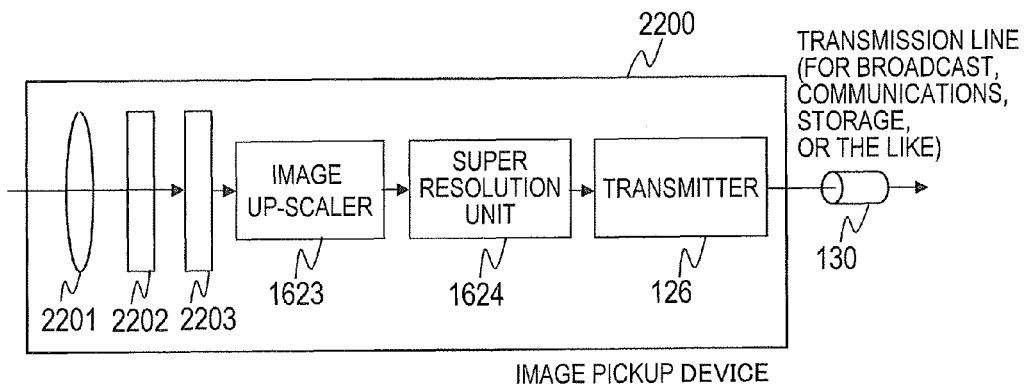
FIG. 21 is a block diagram illustrating a configuration of an image pickup apparatus according to a fourth embodiment of this invention.

FIG. 21 is a block diagram illustrating a configuration of the image pickup device 2200 according to the fourth embodiment of this invention.

The image pickup device 2200 includes a lens 2201, an optical low-pass filter unit 2202, an image sensor 2203, the image up-scaler 1623, the super resolution unit 1624, and the transmitter 126.

The lens 2201 has a light condensing function for acquiring incident light into the image sensor 2203.

The optical low-pass filter unit 2202 has a filter function for passing a given frequency range in the horizontal direction and the vertical direction. The optical low-pass filter unit 2202 generally employs a filter using three crystal plates. Hereinafter, a description is made of the frequency characteristic of the optical low-pass filter unit 2202.

A vertical-direction frequency characteristic of the optical low-pass filter unit 2202 is set so as to pass components corresponding to 1/2 or more of the sampling frequency in the vertical direction acquired from a vertical-direction pitch of the image sensor 2203. Further, a horizontal-direction frequency characteristic is set so as to pass components which correspond to 1/2 or more of frequency components of the sampling frequency in the horizontal direction acquired from a horizontal-direction pitch of the image sensor 2203 and which is equal to or higher than such a frequency as to prevent an overlap from being caused in the aliasing components that occur in the vertical direction.

Specifically, an optical low-pass filter that can acquire the frequency spectrum that does not cause an overlap between the aliasing components along the horizontal direction and the aliasing components along the vertical direction that are illustrated in FIG. 7D is used. Therefore, the optical low-pass filter unit 2202 may be implemented by any structure in this invention.

The image sensor 2203 is a general image sensor such as a two-dimensional CCD input unit image sensor or a two-dimensional CMOS image sensor.

In addition, an image pickup device according to the fourth embodiment and the image reception device 120 according to the first embodiment may be used. In other words, the optical low-pass filter unit 2202 generates the aliasing components so as to cause no overlap between the aliasing components in the horizontal direction and the vertical direction. Then, the image reception device 120 according to the first embodiment receives the encoded image data obtained by the compression and encoding, and decodes the received data. In this manner, the acquired field picture is scaled up in the horizontal direction. Accordingly, it is possible to generate a high-resolution field picture exhibiting little image degradation.

Further, the super resolution unit 1624 obtains the angle 304 of the straight line or the edge in the respective pixels of the scaled-up field picture, and changes the extent to which the aliasing components are removed depending on the angle 304 in the same manner as in the first embodiment. This enables the image pickup device 2200 according to the fourth embodiment to generate a high-resolution field picture exhibiting less image degradation.

Further, the horizontal up-scaler 123 and the super resolution unit 124 may be used instead of the image up-scaler 1623 and the super resolution unit 1624 according to the fourth embodiment. Then, the optical low-pass filter unit 2202 passes components corresponding to 1/2 or more of the sampling frequency in the horizontal direction acquired from the horizontal-direction pitch of the image sensor 2203, and passes components corresponding to 1/2 or less of the sampling frequency in the vertical direction acquired from the vertical-direction pitch of the image sensor 2203. This enables the removal of the aliasing components that occur only in the horizontal direction, and it is possible to pick up a high-resolution field row exhibiting little image degradation.

Further, the above-mentioned horizontal up-scaler 123 is caused to scale up the field picture in the vertical direction by rotation by π/2, and the optical low-pass filter unit 2202 may be configured as a filter that passes components corresponding to 1/2 or more of the sampling frequency in the vertical direction acquired from the vertical-direction pitch of the image sensor 2203 as the vertical-direction frequency characteristic thereof and passes components corresponding to 1/2 or less of the sampling frequency in the horizontal direction acquired from the horizontal-direction pitch of the image sensor 2203 as the horizontal-direction frequency characteristic thereof. This enables the removal of the aliasing components that occur only in the vertical direction, and it is possible to pick up a high-resolution field picture exhibiting little image degradation.

According to the image transfer system of this embodiment, the image is scaled down on the image transmission device, and hence the image can be encoded at a high compression rate and transmitted to the image reception device.

Further, by changing the amount of aliasing components to be removed based on the angle 304 of the straight line or the edge displayed in the image, it is possible to generate a high-resolution image exhibiting little image degradation from the image obtained by scaling down and scaling up the image by the interlace scanning or the progressive scanning.

While the present invention has been described in detail and pictorially in the accompanying drawings, the present invention is not limited to such detail but covers various obvious modifications and equivalent arrangements, which fall within the purview of the appended claims.

What is claimed is:

1. An image transfer system, comprising:
an image transmission unit that transmits an image, the image transmission unit including a processor and a memory; and
an image reception unit that receives the image transmitted from the image transmission unit, the image reception unit including a processor and a memory, wherein:
the memory of the image transmission unit includes instructions which cause the processor of the image transmission unit to:
scale down the image, and
transmit the scaled-down image to the image reception unit; and
the memory of the image reception unit includes instructions which cause the processor of the image reception unit to:
calculate an angle between a line displayed in the image transmitted from the image transmission unit and a horizontal direction of the image in correspondence with pixels included in the image,
scale up the image transmitted from the image transmission unit, and
remove an aliasing component of the scaled-up image based on the calculated angle.

2. The image transfer system according to claim 1, wherein:
the image is an image displayed by interlace scanning;
the processor of the image transmission unit is further caused to:
scale down the image in the horizontal direction of the image; and
the processor of the image reception unit is further caused to:
scale up the image transmitted from the image transmission unit in the horizontal direction of the image, and
remove aliasing components along the horizontal direction of the scaled-up image based on the calculated angle.

3. The image transfer system according to claim 1, wherein the processor of the image reception unit is further caused to:
decrease an amount of aliasing components to be removed from the scaled-up image as the calculated angle between the line displayed in the image and the horizontal direction of the image is more vertical, and
increase the amount of the aliasing components to be removed from the scaled-up image as the calculated angle between the line displayed in the image and the horizontal direction of the image is more parallel.

4. The image transfer system according to claim 1, wherein:
- the processor of the image transmission unit is further caused to:
- scale down the image by reducing intervals of a frequency at which the image is sampled with a predetermined conversion rate and deleting components other than components within a frequency band included between the frequency for the sampling and a predetermined cut-off frequency, and
- transmit the predetermined conversion rate and the predetermined cut-off frequency to the image reception unit; and
- the processor of the image reception unit is further caused to:
- scale up the image transmitted from the image transmission unit based on the predetermined conversion rate and the predetermined cut-off frequency that have been received,
- estimate a frequency that causes the aliasing component based on the predetermined conversion rate and the predetermined cut-off frequency that have been received, and
- remove the aliasing component of the scaled-up image based on the estimated frequency and the calculated angle.

5. The image transfer system according to claim 1, wherein:
- the image is an image displayed by progressive scanning;
- the processor of the image transmission unit is further caused to:
- scale down the image in the horizontal direction and a vertical direction of the image; and
- the processor of the image reception unit is further caused to:
- scale up the image transmitted from the image transmission unit in the horizontal direction and the vertical direction of the image, and
- remove aliasing components along the horizontal direction and the vertical direction of the scaled-up image based on the calculated angle.

6. The image transfer system according to claim 1, further comprising an image pickup device that picks up an image, wherein the processor of the image transmission unit processes the image picked-up by the image pickup device and transmits the processed image to the image reception unit.

7. The image transfer system according to claim 1, wherein:
- each of the pixels in the image includes at least one of a brightness component and a color-difference component; and
- the processor of the image reception unit is further caused to:
- determine one of the brightness component and the color-difference component that corresponds to the each of the pixels,
- determine the pixel whose aliasing component is not to be removed and the pixel whose aliasing component is to be removed based on the determined one of the brightness component and the color-difference component, and
- remove the aliasing component of the determined pixel whose aliasing component is to be removed.

8. An image transfer method, which is performed by an image transfer system including an image transmission unit that transmits an image and an image reception unit that receives the image transmitted from the image transmission unit, the image transfer method including the steps of:
- scaling down, by the image transmission unit, the image;
- transmitting, by the image transmission unit, the scaled-down image to the image reception unit;
- calculating, by the image reception unit, an angle between a line displayed in the image transmitted from the image transmission unit and a horizontal direction of the image in correspondence with pixels included in the image;
- scaling up, by the image reception unit, the image transmitted from the image transmission unit; and
- removing, by the image reception unit, an aliasing component of the scaled-up image based on the calculated angle.

9. The image transfer method according to claim 8, wherein:
- the image is an image displayed by interlace scanning;
- in the step of scaling down of the image, the image transmission unit scales down the image in the horizontal direction of the image;
- in the step of scaling up of the image, the image reception unit scales up the image transmitted from the image transmission unit in the horizontal direction of the image; and
- in the step of removing of the aliasing component, the image reception unit removes aliasing components along the horizontal direction of the scaled-up image based on the calculated angle.

10. The image transfer method according to claim 8, wherein the step of removing of the aliasing component includes the steps of:
- decreasing, by the image reception unit, an amount of aliasing components to be removed from the scaled-up image as the calculated angle between the line displayed in the image and the horizontal direction of the image is more vertical; and
- increasing, by the image reception unit, the amount of the aliasing components to be removed from the scaled-up image as the calculated angle between the line displayed in the image and the horizontal direction of the image is more parallel.

11. The image transfer method according to claim 8, wherein:
- in the step of scaling down of the image, the image transmission unit scales down the image by reducing intervals of a frequency at which the image is sampled with a predetermined conversion rate and deleting components other than components within a frequency band included between the frequency for the sampling and a predetermined cut-off frequency;
- in the step of transmitting of the scaled-down image to the image reception unit, the image transmission unit transmits the predetermined conversion rate and the predetermined cut-off frequency to the image reception unit;
- in the step of scaling up of the image, the image reception unit scales up the image transmitted from the image transmission unit based on the predetermined conversion rate and the predetermined cut-off frequency that have been received; and
- in the step of removing of the aliasing component, the image reception unit estimates a frequency that causes the aliasing component based on the predetermined conversion rate and the predetermined cut-off frequency that have been received, and removes the aliasing component of the scaled-up image based on the estimated frequency and the calculated angle.

12. The image transfer method according to claim 8, wherein:
the image is an image displayed by progressive scanning;
in the step of scaling down of the image, the image transmission unit scales down the image in the horizontal direction and a vertical direction of the image;
in the step of scaling up of the image, the image reception unit scales up the image transmitted from the image transmission unit in the horizontal direction and the vertical direction of the image; and
in the step of removing of the aliasing component, the image reception unit removes aliasing components along the horizontal direction and the vertical direction of the scaled-up image based on the calculated angle.

13. The image transfer method according to claim 8, wherein:
each of the pixels in the image includes one of a brightness component and a color-difference component; and
the step of removing of the aliasing component includes the steps of
determining, by the image reception unit, at least one of the brightness component and the color-difference component that corresponds to the each of the pixels,
determining, by the image reception unit, the pixel whose aliasing component is not to be removed and the pixel whose aliasing component is to be removed based on the determined one of the brightness component and the color-difference component, and
removing, by the image reception unit, the aliasing component of the determined pixel whose aliasing component is to be removed.

14. An image reception apparatus for receiving an image from an image transmission apparatus coupled to the image reception apparatus via a communication line, comprising:
a processor; and
a memory including instructions which cause the processor to:
calculate an angle between a line displayed in the received image which has been scaled down by the image transmission apparatus and a horizontal direction of the image in correspondence with pixels included in the image;
scale up the received image transmitted from the image transmission apparatus; and
remove an aliasing component of the scaled-up image based on the calculated angle corresponding to the pixels.

15. The image reception apparatus according to claim 14, wherein:
the image comprises an image displayed by interlace scanning; and
the processor is further caused to:
scale up the image, which has been scaled down by the image transmission apparatus in the horizontal direction of the image, in the horizontal direction of the image, and
remove aliasing components along the horizontal direction of the scaled-up image based on the calculated angle.

16. The image reception apparatus according to claim 14, wherein the processor is further caused to:
scale up the image transmitted from the image transmission apparatus based on a predetermined conversion rate and a predetermined cut-off frequency that have been transmitted from the image transmission apparatus;
estimate a frequency that causes the aliasing component based on the predetermined conversion rate and the predetermined cut-off frequency that have been received; and
remove the aliasing component of the scaled-up image based on the estimated frequency and the calculated angle.

17. The image reception apparatus according to claim 14, wherein:
the image is an image displayed by progressive scanning; and
the processor is further caused to:
scale up the image, which has been scaled down by the image transmission apparatus in the horizontal direction and a vertical direction, in the horizontal direction and the vertical direction of the image, and
remove aliasing components along the horizontal direction and the vertical direction of the scaled-up image based on the calculated angle.

* * * * *